(12) United States Patent
Zhang et al.

(10) Patent No.: US 12,726,640 B2
(45) Date of Patent: Sep. 1, 2026

(54) METHOD, AN APPARATUS AND A COMPUTER PROGRAM PRODUCT FOR IMAGE AND VIDEO PROCESSING

(71) Applicant: Nokia Technologies Oy, Espoo (FI)

(72) Inventors: Honglei Zhang, Tampere (FI); Francesco Cricrì, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/116,325

(22) PCT Filed: Sep. 5, 2023

(86) PCT No.: PCT/EP2023/074218
§ 371 (c)(1),
(2) Date: Mar. 27, 2025

(87) PCT Pub. No.: WO2024/068190
PCT Pub. Date: Apr. 4, 2024

(65) Prior Publication Data

US 2026/0019605 A1 Jan. 15, 2026

Related U.S. Application Data

(60) Provisional application No. 63/411,268, filed on Sep. 29, 2022.

(51) Int. Cl.
*H04N 19/189* (2014.01)
*H04N 19/136* (2014.01)

(52) U.S. Cl.
CPC ......... *H04N 19/189* (2014.11); *H04N 19/136* (2014.11)

(58) Field of Classification Search
CPC ........................... H04N 19/189; H04N 19/136
(Continued)

(56) References Cited

U.S. PATENT DOCUMENTS 9,456,111 B2 * 9/2016 Fu .......................... H04N 25/60
11,234,023 B2 * 1/2022 Gladding ................ H03M 7/40
(Continued)

FOREIGN PATENT DOCUMENTS

TW 202516918 A * 4/2025 ........... H04N 19/463

OTHER PUBLICATIONS

"Video coding for low bit rate communication", Series H: Audiovisual and Multimedia Systems, Infrastructure of audiovisual services—Coding of moving video, ITU-T Recommendation H.263, Jan. 2005, 226 pages.
(Continued)

*Primary Examiner* — Justin W Rider
(74) *Attorney, Agent, or Firm* — Nokia Technologies Oy

(57) ABSTRACT

The embodiments relate to method for encoding and decoding. The method for decoding comprises receiving an input bitstream; determining a first distribution function having an input range with a minimum limit value and a maximum limit value; determining a second distribution function having an input range with a minimum limit value and a maximum limit value; decoding a value from the bitstream using a first distribution function; determining when the value equals with the OOR-value of the first distribution function; whereupon the method further comprises defining a positive value variable to be the maximum value of the input range of the first distribution function; defining a negative value variable to be the minimum value of the input range of the first distribution function; decoding the value from the bitstream using the second distribution function, whereupon the method further comprises determining when the decoded value is the OOR value of the second distribution function, in which case the positive value variable is updated with the maximum limit value of the second distribution function; and the negative value variable is updated
(Continued)

with the minimum limit value of the second distribution function; a value is decoded from the bitstream using the second distribution function; determining when the decoded value is different from the OOR value and is greater or equal to zero, whereupon the positive value variable is updated with the decoded value; and determining when the decoded value is different from the OOR value and smaller than zero, whereupon the negative value variable is updated with the decoded value; creating a representable media according to the positive and/or negative value variables.

17 Claims, 10 Drawing Sheets

(58) Field of Classification Search
USPC .................................................... 375/240.26
See application file for complete search history.

(56) References Cited

U.S. PATENT DOCUMENTS

2020/0014922 A1* 1/2020 Ramasubramonian ...................... H04N 19/82
2020/0359050 A1* 11/2020 Van der Auwera .... H04N 19/80

OTHER PUBLICATIONS

"Advanced video coding for generic audiovisual services", Series H: Audiovisual And Multimedia Systems, Infrastructure of audiovisual services—Coding of moving video, ITU-T Recommendation H.264, Aug. 2021, 844 pages.
"High efficiency video coding", Series H: Audiovisual And Multimedia Systems, Infrastructure of audiovisual services—Coding of moving video, Recommendation ITU-T H.265, Aug. 2021, 716 pages.
"Versatile video coding", Series H: Audiovisual and Multimedia Systems, Infrastructure of audiovisual services—Coding of moving video, Recommendation ITU-T H.266, Aug. 2020, 516 pages.
"Versatile supplemental enhancement information messages for coded video bitstreams", Series H: Audiovisual and Multimedia Systems, Infrastructure of audiovisual services—Coding of moving video, Recommendation ITU-T H.274, Aug. 2020, 86 pages.
International Search Report and Written Opinion received for corresponding Patent Cooperation Treaty Application No. PCT/EP2023/074218, dated Dec. 13, 2023, 12 pages.
Guo et al., "Accelerate Neural Image Compression with Channel-Adaptive Arithmetic Coding", IEEE International Symposium on Circuits and Systems (ISCAS), May 22-28, 2021, 5 pages.
Zhang et al., "[VCM] Response to the CfP of the VCM by Nokia", Nokia, ISO/IEC JTC 1/SC 29/WG 2, m60753, Oct. 2022, 25 pages.

* cited by examiner

METHOD, AN APPARATUS AND A COMPUTER PROGRAM PRODUCT FOR IMAGE AND VIDEO PROCESSING

RELATED APPLICATION

This application claims priority to PCT Patent Application No. PCT/EP2023/074218, filed 5 Sep. 2023, which claims priority from United States of America Application No. 63/411,268, filed on 29 Sep. 2022, which is incorporated herein by reference in its entirety.

TECHNICAL FIELD

The present solution generally relates to image and video processing.

BACKGROUND

One of the elements in image and video compression is to compress data while maintaining the quality to satisfy human perceptual ability. However, in recent development of machine learning, machines can replace humans when analyzing data for example in order to detect events and/or objects in video/image. The present embodiments can be utilized in Video Coding for Machines, but also in other use cases.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided an apparatus for encoding comprising means for receiving an input media, wherein the input media is a representation comprising a plurality of elements; means for obtaining an input value, the input value representing an element of the representation; means for determining a first distribution function having an input range with a minimum limit value and a maximum limit value; means for determining a second distribution function having an input range with a minimum limit value and a maximum limit value; means for defining out-of-range (OOR) values for first and second distribution functions; means for determining when the input value is not within the input range of the first distribution function, whereupon a limit value that the input value spans from the input range is defined to be an exceeded limit value, and the apparatus further comprises means for encoding the OOR value of the first distribution function into a bitstream using the first distribution function; means for determining a difference value based on the input value and the exceeded limit value; means for comparing the difference value to the input range of the second distribution function and performing the following as long as the difference value is outside the input range of the second distribution function: encoding the OOR value of the second distribution function into the bitstream using the second distribution function; updating the difference value based on its difference to one of the limit values of the second distribution function; and encoding the difference value using the second distribution function.

According to a second aspect, there is provided a method for encoding, comprising receiving an input media, wherein the input media is a representation comprising a plurality of elements; obtaining an input value, the input value representing an element of the representation; determining a first distribution function having an input range with a minimum limit value and a maximum limit value; determining a second distribution function having an input range with a minimum limit value and a maximum limit value; defining out-of-range (OOR) values for first and second distribution functions; determining when the input value is not within the input range of the first distribution function, whereupon a limit value that the input value spans from the input range is defined to be an exceeded limit value and the method further comprises encoding the OOR value of the first distribution function into a bitstream using the first distribution function; determining a difference value based on the input value and the exceeded limit value; comparing the difference value to the input range of the second distribution function and performing the following as long as the difference value is outside the input range of the second distribution function: encoding the OOR value of the second distribution function into the bitstream using the second distribution function; updating the difference value based on its difference to one of the limit values of the second distribution function; encoding the difference value using the second distribution function.

According to a third aspect, there is provided an apparatus for encoding comprising at least one processor, memory including computer program code, the memory and the computer program code configured to, with the at least one processor, cause the apparatus to perform at least the following: receive an input media, wherein the input media is a representation comprising a plurality of elements; obtain an input value, the input value representing an element of the representation; determine a first distribution function having an input range with a minimum limit value and a maximum limit value; determine a second distribution function having an input range with a minimum limit value and a maximum limit value; define out-of-range (OOR) values for first and second distribution functions; determine when the input value is not within the input range of the first distribution function, whereupon a limit value that the input value spans from the input range is defined to be an exceeded limit value and the apparatus is further caused to encode the OOR value of the first distribution function into a bitstream using the first distribution function; determine a difference value based on the input value and the exceeded limit value; compare the difference value to the input range of the second distribution function and performing the following as long as the difference value is outside the input range of the second distribution function: encode the OOR value of the second distribution function into the bitstream using the second distribution function; update the difference value based on its difference to one of the limit values of the second distribution function; encode the difference value using the second distribution function.

According to a fourth aspect, there is provided computer program product for encoding comprising computer program code configured to, when executed on at least one processor, cause an apparatus or a system to: receive an input media, wherein the input media is a representation comprising a plurality of elements; obtain an input value, the input value representing an element of the representation; determine a first distribution function having an input range with a minimum limit value and a maximum limit value; determine a second distribution function having an input range with a minimum limit value and a maximum limit value; define out-of-range (OOR) values for first and second distribution functions; determine when the input value is not within the input range of the first distribution function, whereupon a limit value that the input value spans from the input range is defined to be an exceeded limit value and the apparatus is further caused to encode the OOR value of the first distribution function into a bitstream using the first distribution function; determine a difference value based on the input value and the exceeded limit value; compare the difference value to the input range of the second distribution function and performing the following as long as the difference value is outside the input range of the second distribution function: encode the OOR value of the second distribution function into the bitstream using the second distribution function; update the difference value based on its difference to one of the limit values of the second distribution function; encode the difference value using the second distribution function.

According to a fifth aspect, there is provided an apparatus for decoding comprising means for receiving an input bitstream; means for determining a first distribution function having an input range with a minimum limit value and a maximum limit value; means for determining a second distribution function having an input range with a minimum limit value and a maximum limit value; means for decoding a value from the bitstream using a first distribution function; means for determining when the value equals with the OOR-value of the first distribution function whereupon the apparatus further comprises means for defining a positive value variable to be the maximum value of the input range of the first distribution function; means for defining a negative value variable to be the minimum value of the input range of the first distribution function; means for decoding the value from the bitstream using the second distribution function, whereupon the apparatus further comprises means for determining when the decoded value is the OOR value of the second distribution function, in which case the positive value variable is updated with the maximum limit value of the second distribution function; and the negative value variable is updated with the minimum limit value of the second distribution function; a value is decoded from the bitstream using the second distribution function; means for determining when the decoded value is different from the OOR value and is greater or equal to zero, whereupon the positive value variable is updated with the decoded value; and means for determining when the decoded value is different from the OOR value and smaller than zero, whereupon the negative value variable is updated with the decoded value; means for creating a representable media according to the positive and/or negative value variables.

According to a sixth aspect, there is provided a method for decoding, comprising receiving an input bitstream; determining a first distribution function having an input range with a minimum limit value and a maximum limit value; determining a second distribution function having an input range with a minimum limit value and a maximum limit value; decoding a value from the bitstream using a first distribution function; determining when the value equals with the OOR-value of the first distribution function; whereupon the method further comprises defining a positive value variable to be the maximum value of the input range of the first distribution function; defining a negative value variable to be the minimum value of the input range of the first distribution function; decoding the value from the bitstream using the second distribution function, whereupon the method further comprises determining when the decoded value is the OOR value of the second distribution function, in which case the positive value variable is updated with the maximum limit value of the second distribution function; and the negative value variable is updated with the minimum limit value of the second distribution function; a value is decoded from the bitstream using the second distribution function; determining when the decoded value is different from the OOR value and is greater or equal to zero, whereupon the positive value variable is updated with the decoded value; and determining when the decoded value is different from the OOR value and smaller than zero, whereupon the negative value variable is updated with the decoded value; creating a representable media according to the positive and/or negative value variables.

According to a seventh aspect, there is provided an apparatus for decoding comprising at least one processor, memory including computer program code, the memory and the computer program code configured to, with the at least one processor, cause the apparatus to perform at least the following: receive an input bitstream; determine a first distribution function having an input range with a minimum limit value and a maximum limit value; determine a second distribution function having an input range with a minimum limit value and a maximum limit value; decode a value from the bitstream using a first distribution function; determine when the value equals with the OOR-value of the first distribution function whereupon the apparatus is further caused to define a positive value variable to be the maximum value of the input range of the first distribution function; define a negative value variable to be the minimum value of the input range of the first distribution function; decode the value from the bitstream using the second distribution function, whereupon the apparatus is further caused to determine when the decoded value is the OOR value of the second distribution function, in which case the positive value variable is updated with the maximum limit value of the second distribution function; and the negative value variable is updated with the minimum limit value of the second distribution function; a value is decoded from the bitstream using the second distribution function; determine when the decoded value is different from the OOR value and is greater or equal to zero, whereupon the positive value variable is updated with the decoded value; and determine when the decoded value is different from the OOR value and smaller than zero, whereupon the negative value variable is updated with the decoded value; create a representable media according to the positive and/or negative value variables.

According to an eighth aspect, there is provided computer program product for decoding comprising computer program code configured to, when executed on at least one processor, cause an apparatus or a system to: receive an input bitstream; determine a first distribution function having an input range with a minimum limit value and a maximum limit value; determine a second distribution function having an input range with a minimum limit value and a maximum limit value; decode a value from the bitstream using a first distribution function; determine when the value equals with the OOR-value of the first distribution function whereupon the apparatus is further caused to define a positive value variable to be the maximum value of the input range of the first distribution function; define a negative value variable to be the minimum value of the input range of the first distribution function; decode the value from the bitstream using the second distribution function, whereupon the apparatus is further caused to determine when the decoded value is the OOR value of the second distribution function, in which case the positive value variable is updated with the maximum limit value of the second distribution function; and the negative value variable is updated with the minimum limit value of the second distribution function; a value is decoded from the bitstream using the second distribution function; determine when the decoded value is different from the OOR value and is greater or equal to zero, whereupon the positive value variable is updated with the decoded value; and determine when the decoded value is different from the OOR value and smaller than zero, whereupon the negative value variable is updated with the decoded value; create a representable media according to the positive and/or negative value variables.

According to an embodiment, when the exceeded limit value is the maximum limit value of the first distribution function, the apparatus comprises means for encoding the OOR value using the first distribution function; means for determining a difference value based on the input value and the maximum value of the input range of the first distribution function; means for comparing the difference value to the input range of the second distribution function, and performing the following as long as the difference value is outside the input range of the second distribution function: encoding the OOR value using the second distribution function; updating the difference value based on its difference to the to the maximum input value of the second distribution function; encoding the difference value using the second distribution function.

According to an embodiment, when the exceeded limit value is the minimum limit value of the first distribution function, the apparatus comprises means for encoding the OOR value using the first distribution function; means for determining a difference value based on the input value and the minimum value of input range of the first distribution function; means for comparing the difference value to the input range of the second distribution function, and performing the following as long as the difference value is outside the input range of the second distribution function: encoding the OOR value using the second distribution function; updating the difference value based on its difference to the minimum input value of the second distribution function; encoding the difference value using the second distribution function.

According to an embodiment, the second distribution function is an OOR distribution function configured to encode OOR values.

According to an embodiment, the second distribution function is the first distribution function.

According to an embodiment, the second distribution function is determined by the estimate variance value of the first distribution function.

According to an embodiment, the OOR value is a minimum, or a maximum, or any value of the input range.

According to an embodiment, the OOR value is signaled to a decoder.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

Figure 1:
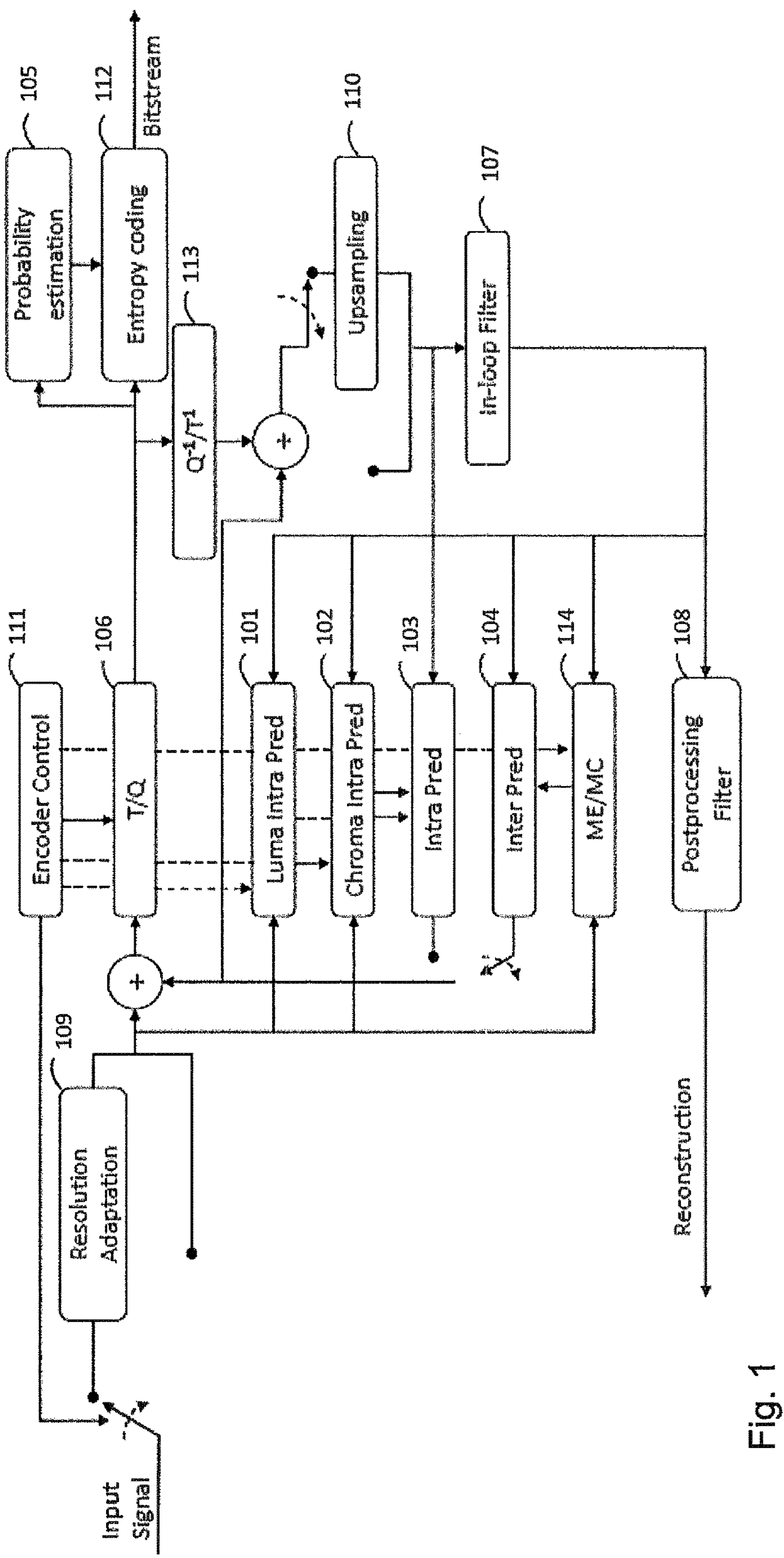
FIG. 1 shows an example of a codec with neural network (NN) components.

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment is included in at least one embodiment of the disclosure.

Before discussing the present embodiments in more detailed manner, a short reference to related technology is given.

In the context of machine learning, a neural network (NN) is a computation graph consisting of several layers of computation, i.e. several portions of computation. Each layer consists of one or more units, where each unit performs an elementary computation. A unit is connected to one or more other units, and the connection may have associated with a weight. The weight may be used for scaling the signal passing through the associated connection. Weights are learnable parameters, i.e., values which can be learned from training data. There may be other learnable parameters, such as those of batch-normalization layers.

Two widely used architectures for neural networks are feed-forward and recurrent architectures. Feed-forward neural networks are such that there is no feedback loop: each layer takes input from one or more of the layers before and provides its output as the input for one or more of the subsequent layers. Also, units inside a certain layer take input from units in one or more of preceding layers and provide output to one or more of following layers.

Initial layers (those close to the input data) extract semantically low-level features such as edges and textures in images, and intermediate and final layers extract more high-level features. After the feature extraction layers there may be one or more layers performing a certain task, such as classification, semantic segmentation, object detection, denoising, style transfer, super-resolution, etc. In recurrent neural nets, there is a feedback loop, so that the network becomes stateful, i.e., it is able to memorize information or a state.

Neural networks are being utilized in an ever-increasing number of applications for many different types of devices, such as mobile phones. Examples include image and video analysis and processing, social media data analysis, device usage data analysis, etc.

One of the important properties of neural networks (and other machine learning tools) is that they are able to learn properties from input data, either in supervised way or in unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output's error, also referred to as the loss. Examples of losses are mean squared error, cross-entropy, etc. In recent deep learning techniques, training is an iterative process, where at each iteration the algorithm modifies the weights of the neural net to make a gradual improvement of the network's output, i.e., to gradually decrease the loss.

In this description, terms "model" and "neural network" are used interchangeably, and also the weights of neural networks are sometimes referred to as learnable parameters or simply as parameters.

Training a neural network is an optimization process. The goal of the optimization or training process is to make the model learn the properties of the data distribution from a limited training dataset. In other words, the goal is to learn to use a limited training dataset in order to learn to generalize to previously unseen data, i.e., data which was not used for training the model. This is usually referred to as generalization. In practice, data may be split into at least two sets, the training set and the validation set. The training set is used for training the network, i.e., to modify its learnable parameters in order to minimize the loss. The validation set is used for checking the performance of the network on data, which was not used to minimize the loss, as an indication of the final performance of the model. In particular, the errors on the training set and on the validation set are monitored during the training process to understand the following things:

- If the network is learning at all—in this case, the training set error should decrease, otherwise the model is in the regime of underfitting.
- If the network is learning to generalize—in this case, also the validation set error needs to decrease and to be not too much higher than the training set error. If the training set error is low, but the validation set error is much higher than the training set error, or it does not decrease, or it even increases, the model is in the regime of overfitting. This means that the model has just memorized the training set's properties and performs well only on that set but performs poorly on a set not used for tuning its parameters.

Lately, neural networks have been used for compressing and de-compressing data such as images, i.e., in an image codec. The most widely used architecture for realizing one component of an image codec is the auto-encoder, which is a neural network consisting of two parts: a neural encoder and a neural decoder. The neural encoder takes as input an image and produces a code which requires less bits than the input image. This code may be obtained by applying a binarization or quantization process to the output of the encoder. The neural decoder takes in this code and reconstructs the image which was input to the neural encoder.

Such neural encoder and neural decoder may be trained to minimize a combination of bitrate and distortion, where the distortion may be based on one or more of the following metrics: Mean Squared Error (MSE), Peak Signal-to-Noise Ratio (PSNR), Structural Similarity Index Measure (SSIM), or similar. These distortion metrics are meant to be correlated to the human visual perception quality, so that minimizing or maximizing one or more of these distortion metrics results into improving the visual quality of the decoded image as perceived by humans.

Video codec comprises an encoder that transforms the input video into a compressed representation suited for storage/transmission and a decoder that can decompress the compressed video representation back into a viewable form. An encoder may discard some information in the original video sequence in order to represent the video in a more compact form (that is, at lower bitrate).

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). Extensions of the H.264/AVC include Scalable Video Coding (SVC) and Multiview Video Coding (MVC).

The High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range, three-dimensional, and screen content coding extensions which may be abbreviated SHVC, MV-HEVC, REXT, 3D-HEVC, and SCC, respectively.

Versatile Video Coding (H.266 a.k.a. VVC), defined in ITU-T Recommendation H.266 and equivalently in ISO/IEC 23090-3, (also referred to as MPEG-I Part 3) is a video compression standard developed as the successor to HEVC. A reference software for VVC is the VVC Test Model (VTM).

A specification of the AV1 bitstream format and decoding process were developed by the Alliance of Open Media (AOM). The AV1 specification was published in 2018. AOM is reportedly working on the AV2 specification.

An elementary unit for the input to a video encoder and the output of a video decoder, respectively, in most cases is a picture. A picture given as an input to an encoder may also be referred to as a source picture, and a picture decoded by a decoder may be referred to as a decoded picture or a reconstructed picture.

The source and decoded pictures are each comprises of one or more sample arrays, such as one of the following sets of sample arrays:

Luma (Y) only (monochrome),

Luma and two chroma (YCbCr or YCgCo),

Green, Blue and Red (GBR, also known as RGB),

Arrays representing other unspecified monochrome or tri-stimulus color samplings (for example, YZX, also known as XYZ).

A component may be defined as an array or single sample from one of the three sample arrays (luma and two chroma) that compose a picture, or the array or a single sample of the array that compose a picture in monochrome format.

Hybrid video codecs, for example ITU-T H.263 and H.264, may encode the video information in two phases. Firstly, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e., the difference between the predicted block of pixels and the original block of pixels, is coded. This may be done by transforming the difference in pixel values using a specified transform (e.g., Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, exploits temporal redundancy. In inter prediction the sources of prediction are previously decoded pictures.

Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means, the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

In video codecs, the motion information may be indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently, those may be coded differentially with respect to block specific predicted motion vectors. In video codecs, the predicted motion vectors may be created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or or co-located blocks in temporal reference picture. Moreover, high efficiency video codecs can employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information may be carried out using the motion field information of adjacent blocks and/or co-located blocks in temporal reference pictures and the used motion field information is signaled among a list of motion field candidate list filled with motion field information of available adjacent/co-located blocks.

In video codecs the prediction residual after motion compensation may be first transformed with a transform kernel (like DCT) and then coded. The reason for this is that often there still exists some correlation among the residual and transform can in many cases help reduce this correlation and provide more efficient coding.

Video encoders may utilize Lagrangian cost functions to find optimal coding modes, e.g., the desired coding mode for a block, block partitioning, and associated motion vectors. This kind of cost function uses a weighting factor λ to tie together the (exact or estimated) image distortion due to lossy coding methods and the (exact or estimated) amount of information that is required to represent the pixel values in an image area:

$$C = D + \lambda R$$

where C is the Lagrangian cost to be minimized, D is the image distortion (e.g., Mean Squared Error) with the mode and motion vectors considered, and R the number of bits needed to represent the required data to reconstruct the image block in the decoder (including the amount of data to represent the candidate motion vectors). The rate R may be the actual bitrate or bit count resulting from encoding. Alternatively, the rate R may be an estimated bitrate or bit count. One possible way of the estimating the rate Ris to omit the final entropy encoding step and use e.g., a simpler entropy encoding or an entropy encoder where some of the context states have not been updated according to previously encoding mode selections.

Conventionally used distortion metrics may comprise, but are not limited to, peak signal-to-noise ratio (PSNR), mean squared error (MSE), sum of absolute differences (SAD), sub of absolute transformed differences (SATD), and structural similarity (SSIM), typically measured between the reconstructed video/image signal (that is or would be identical to the decoded video/image signal) and the "original" video/image signal provided as input for encoding.

A partitioning may be defined as a division of a set into subsets such that each element of the set is in exactly one of the subsets.

A bitstream may be defined as a sequence of bits, which may in some coding formats or standards be in the form of a network abstraction layer (NAL) unit stream or a byte stream, that forms the representation of coded pictures and associated data forming one or more coded video sequences.

A bitstream format may comprise a sequence of syntax structures.

A syntax element may be defined as an element of data represented in the bitstream. A syntax structure may be defined as zero or more syntax elements present together in the bitstream in a specified order.

A NAL unit may be defined as a syntax structure containing an indication of the type of data to follow and bytes containing that data in the form of an RBSP interspersed as necessary with start code emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

Some coding formats specify parameter sets that may carry parameter values needed for the decoding or reconstruction of decoded pictures. A parameter may be defined as a syntax element of a parameter set. A parameter set may be defined as a syntax structure that contains parameters and that can be referred to from or activated by another syntax structure for example using an identifier.

A coding standard or specification may specify several types of parameter sets. It needs to be understood that embodiments may be applied but are not limited to the described types of parameter sets and embodiments could likewise be applied to any parameter set type.

A parameter set may be activated when it is referenced e.g., through its identifier. An adaptation parameter set (APS) may be defined as a syntax structure that applies to zero or more slices. There may be different types of adaptation parameter sets. An adaptation parameter set may for example contain filtering parameters for a particular type of a filter. In VVC, three types of APSs are specified carrying parameters for one of: adaptive loop filter (ALF), luma mapping with chroma scaling (LMCS), and scaling lists. A scaling list may be defined as a list that associates each frequency index with a scale factor for the scaling process, which multiplies transform coefficient levels by a scaling factor, resulting in transform coefficients. In VVC, an APS is referenced through its type (e.g., ALF, LMCS, or scaling list) and an identifier. In other words, different types of APSs have their own identifier value ranges.

An Adaptation Parameter Set (APS) may comprise parameters for decoding processes of different types, such as adaptive loop filtering or luma mapping with chroma scaling.

Video coding specifications may enable the use of supplemental enhancement information (SEI) messages or alike. Some video coding specifications include SEI network abstraction layer (NAL) units, and some video coding specifications contain both prefix SEI NAL units and suffix SEI NAL units, where the former type can start a picture unit or alike and the latter type can end a picture unit or alike. An SEI NAL unit contains one or more SEI messages, which are not required for the decoding of output pictures but may assist in related processes, such as picture output timing, post-processing of decoded pictures, rendering, error detection, error concealment, and resource reservation. Several SEI messages are specified in H.264/AVC, H.265/HEVC, H.266/VVC, and H.274/VSEI standards, and the user data SEI messages enable organizations and companies to specify SEI messages for their own use. The standards may contain the syntax and semantics for the specified SEI messages but a process for handling the messages in the recipient might not be defined. Consequently, encoders may be required to follow the standard specifying a SEI message when they create SEI message(s), and decoders might not be required to process SEI messages for output order conformance. One of the reasons to include the syntax and semantics of SEI messages in standards is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified. SEI messages are generally not extended in future amendments or versions of the standard.

The phrase along the bitstream (e.g., indicating along the bitstream) or along a coded unit of a bitstream (e.g., indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

Image and video codecs may use a set of filters to enhance the visual quality of the predicted visual content and can be applied either in-loop or out-of-loop, or both. In the case of in-loop filters, the filter applied on one block in the currently-encoded frame will affect the encoding of another block in the same frame and/or in another frame which is predicted from the current frame. An in-loop filter can affect the bitrate and/or the visual quality. In fact, an enhanced block will cause a smaller residual (difference between original block and predicted-and-filtered block), thus requiring less bits to be encoded. An out-of-the loop filter will be applied on a frame after it has been reconstructed, the filtered visual content won't be as a source for prediction, and thus it may only impact the visual quality of the frames that are output by the decoder.

Recently, neural network (NNs) have been used in the context of image and video compression by following mainly two approaches.

In one approach, NNs are used to replace one or more of the components of a traditional codec such as VVC/H.266. Here, term "traditional" refers to those codecs whose components and their parameters may not be learned from data. Examples of such components are:

- Additional in-loop filter, for example by having the NN as an additional in-loop filter with respect to the traditional loop filters.

Single in-loop filter, for example by having the NN replacing all traditional in-loop filters.
Intra-frame prediction.
Inter-frame prediction.
Transform and/or inverse transform.
Probability model for the arithmetic codec.
Etc.

FIG. 1 illustrates examples of functioning of NNs as components of a traditional codec's pipeline, in accordance with an embodiment. In particular, FIG. 1 illustrates an encoder, which also includes a decoding loop. FIG. 1 is shown to include components described below:

A luma intra pred block or circuit 101. This block or circuit performs intra prediction in the luma domain, for example, by using already reconstructed data from the same frame. The operation of the luma intra pred block or circuit 101 may be performed by a deep neural network such as a convolutional auto-encoder.

A chroma intra pred block or circuit 102. This block or circuit performs intra prediction in the chroma domain, for example, by using already reconstructed data from the same frame. The chroma intra pred block or circuit 102 may perform cross-component prediction, for example, predicting chroma from luma. The operation of the chroma intra pred block or circuit 102 may be performed by a deep neural network such as a convolutional auto-encoder.

An intra pred block or circuit 103 and inter-pred block or circuit 104. These blocks or circuit perform intra prediction and inter-prediction, respectively. The intra pred block or circuit 103 and the inter-pred block or circuit 104 may perform the prediction on all components, for example, luma and chroma. The operations of the intra pred block or circuit 103 and inter-pred block or circuit 104 may be performed by two or more deep neural networks such as convolutional auto-encoders.

A probability estimation block or circuit 105 for entropy coding. This block or circuit performs prediction of probability for the next symbol to encode or decode, which is then provided to the entropy coding module 112, such as the arithmetic coding module, to encode or decode the next symbol. The operation of the probability estimation block or circuit 105 may be performed by a neural network.

A transform and quantization (T/Q) block or circuit 106. These are actually two blocks or circuits. The transform and quantization block or circuit 106 may perform a transform of input data to a different domain, for example, the FFT transform would transform the data to frequency domain. The transform and quantization block or circuit 106 may quantize its input values to a smaller set of possible values. In the decoding loop, there may be inverse quantization block or circuit and inverse transform block or circuit 113. One or both of the transform block or circuit and quantization block or circuit may be replaced by one or two or more neural networks. One or both of the inverse transform block or circuit and inverse quantization block or circuit 113 may be replaced by one or two or more neural networks.

An in-loop filter block or circuit 107. Operations of the in-loop filter block or circuit 107 is performed in the decoding loop, and it performs filtering on the output of the inverse transform block or circuit, or anyway on the reconstructed data, in order to enhance the reconstructed data with respect to one or more predetermined quality metrics. This filter may affect both the quality of the decoded data and the bitrate of the bitstream output by the encoder. The operation of the in-loop filter block or circuit 107 may be performed by a neural network, such as a convolutional auto-encoder. In examples, the operation of the in-loop filter may be performed by multiple steps or filters, where the one or more steps may be performed by neural networks.

A postprocessing filter block or circuit 108. The postprocessing filter block or circuit 108 may be performed only at decoder side, as it may not affect the encoding process. The postprocessing filter block or circuit 108 filters the reconstructed data output by the in-loop filter block or circuit 107, in order to enhance the reconstructed data. The postprocessing filter block or circuit 108 may be replaced by a neural network, such as a convolutional auto-encoder.

A resolution adaptation block or circuit 109: this block or circuit may downsample the input video frames, prior to encoding. Then, in the decoding loop, the reconstructed data may be upsampled, by the upsampling block or circuit 110, to the original resolution. The operation of the resolution adaptation block or circuit 109 block or circuit may be performed by a neural network such as a convolutional auto-encoder.

An encoder control block or circuit 111. This block or circuit performs optimization of encoder's parameters, such as what transform to use, what quantization parameters (QP) to use, what intra-prediction mode (out of N intra-prediction modes) to use, and the like. The operation of the encoder control block or circuit 111 may be performed by a neural network, such as a classifier convolutional network, or such as a regression convolutional network.

An ME/MC block or circuit 114 performs motion estimation and/or motion compensation, which are two key operations to be performed when performing inter-frame prediction. ME/MC stands for motion estimation/motion compensation.

Figure 2:
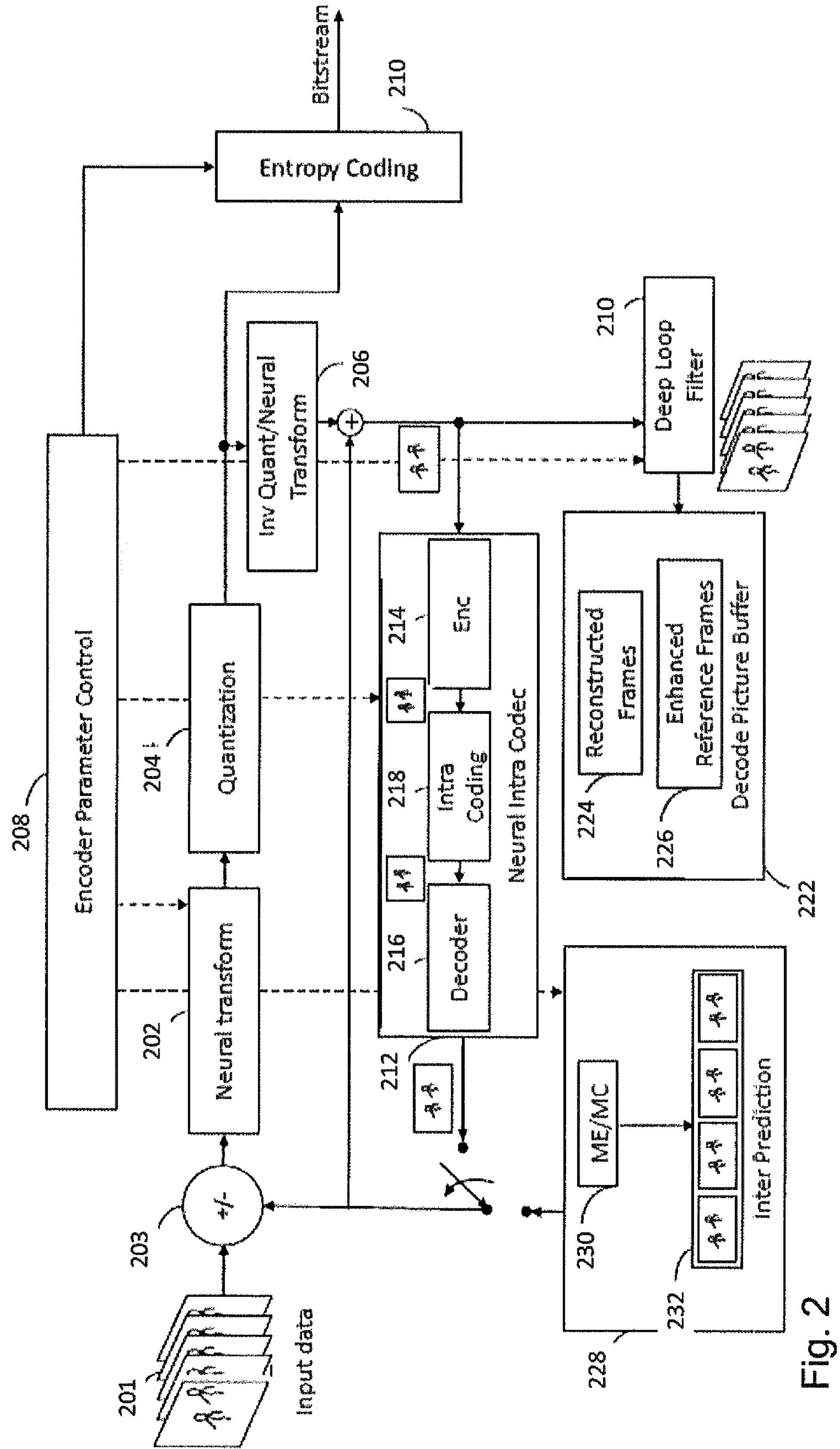
FIG. 2 shows another example of a video coding system with neural network components.

In another approach, commonly referred to as "end-to-end learned compression", NNs are used as the main components of the image/video codecs. In this second approach, there are two main options:

Option 1: re-use the video coding pipeline but replace most or all the components with NNs. Referring to FIG. 2, it illustrates an example of modified video coding pipeline based on a neural network, in accordance with an embodiment. An example of neural network may include, but is not limited to, a compressed representation of a neural network. FIG. 2 is shown to include following components:

A neural transform block or circuit 202: this block or circuit transforms the output of a summation/subtraction operation 203 to a new representation of that data, which may have lower entropy and thus be more compressible.

A quantization block or circuit 204: this block or circuit quantizes an input data 201 to a smaller set of possible values.

An inverse transform and inverse quantization blocks or circuits 206. These blocks or circuits perform the inverse or approximately inverse operation of the transform and the quantization, respectively.

An encoder parameter control block or circuit 208. This block or circuit may control and optimize some or all the parameters of the encoding process, such as parameters of one or more of the encoding blocks or circuits.

An entropy coding block or circuit 210. This block or circuit may perform lossless coding, for example based on entropy. One popular entropy coding technique is arithmetic coding.

A neural intra-codec block or circuit 212. This block or circuit may be an image compression and decompression block or circuit, which may be used to encode and decode an intra frame. An encoder 214 may be an encoder block or circuit, such as the neural encoder part of an auto-encoder neural network. A decoder 216 may be a decoder block or circuit, such as the neural decoder part of an auto-encoder neural network. An intra-coding block or circuit 218 may be a block or circuit performing some intermediate steps between encoder and decoder, such as quantization, entropy encoding, entropy decoding, and/or inverse quantization.

A deep loop filter block or circuit 220. This block or circuit performs filtering of reconstructed data, in order to enhance it.

A decode picture buffer block or circuit 222. This block or circuit is a memory buffer, keeping the decoded frame, for example, reconstructed frames 224 and enhanced reference frames 226 to be used for inter prediction.

An inter-prediction block or circuit 228. This block or circuit performs inter-frame prediction, for example, predicts from frames, for example, frames 232, which are temporally nearby. An ME/MC 230 performs motion estimation and/or motion compensation, which are two key operations to be performed when performing inter-frame prediction. ME/MC stands for motion estimation/motion compensation.

Option 2: re-design the whole pipeline, as follows.

Encoder NN is configured to perform a non-linear transform;

Quantization and lossless encoding of the encoder NN's output;

Lossless decoding and dequantization;

Decoder NN is configured to perform a non-linear inverse transform.

Figure 3:
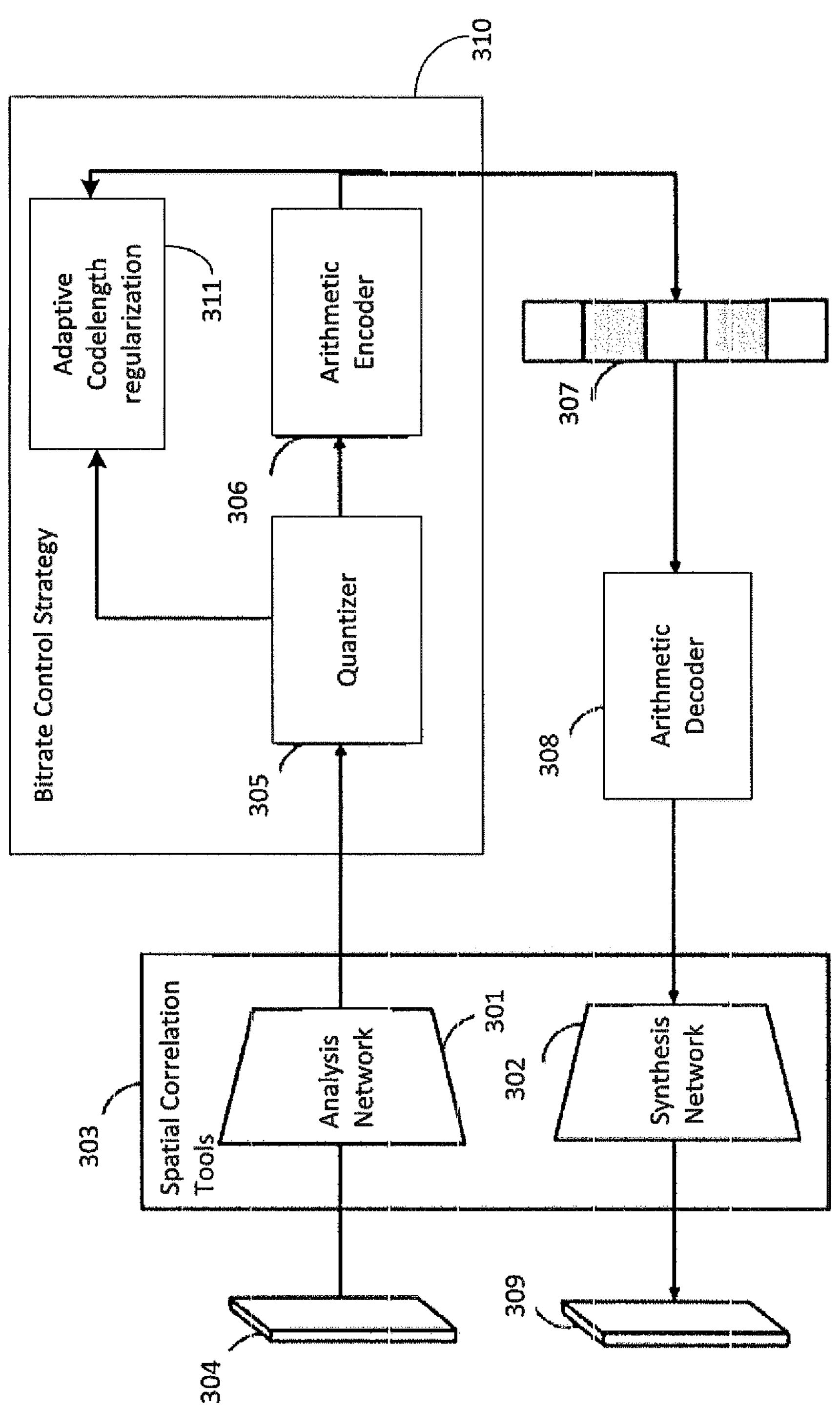
FIG. 3 shows an example of a neural network-based end-to-end learned codec.

An example of option 2 is described in detail in FIG. 3 which shows an encoder NN and a decoder NN being parts of a neural auto-encoder architecture, in accordance with an example. In FIG. 3, the Analysis Network 301 is an Encoder NN, and the Synthesis Network 302 is the Decoder NN, which may together be referred to as spatial correlation tools 303, or as neural auto-encoder.

As shown in FIG. 3, the input data 304 is analyzed by the Encoder NN (Analysis Network 301), which outputs a new representation of that input data. The new representation may be more compressible. This new representation may then be quantized, by a quantizer 305, to a discrete number of values. The quantized data is then lossless encoded, for example by an arithmetic encoder 306, thus obtaining a bitstream 307. The example shown in FIG. 3 includes an arithmetic decoder 308 and an arithmetic encoder 306. The arithmetic encoder 306, or the arithmetic decoder 308, or the combination of the arithmetic encoder 306 and arithmetic decoder 308 may be referred to as arithmetic codec in some embodiments. On the decoding side, the bitstream is first lossless decoded, for example, by using the arithmetic codec decoder 308. The lossless decoded data is dequantized and then input to the Decoder NN, Synthesis Network 302. The output is the reconstructed or decoded data 309.

In case of lossy compression, the lossy steps may comprise the Encoder NN and/or the quantization.

In order to train this system, a training objective function (also called "training loss") may be utilized, which may comprise one or more terms, or loss terms, or simply losses. In one example, the training loss comprises a reconstruction loss term and a rate loss term. The reconstruction loss encourages the system to decode data that is similar to the input data, according to some similarity metric. Examples of reconstruction losses are:

Mean squared error (MSE);

Multi-scale structural similarity (MS-SSIM);

Losses derived from the use of a pretrained neural network. For example, error (f1, f2), where f1 and f2 are the features extracted by a pretrained neural network for the input data and the decoded data, respectively, and error( ) is an error or distance function, such as L1 norm or L2 norm;

Losses derived from the use of a neural network that is trained simultaneously with the end-to-end learned codec. For example, adversarial loss can be used, which is the loss provided by a discriminator neural network that is trained adversarially with respect to the codec, following the settings proposed in the context of Generative Adversarial Networks (GANs) and their variants.

The rate loss encourages the system to compress the output of the encoding stage, such as the output of the arithmetic encoder. By "compressing", we mean reducing the number of bits output by the encoding stage.

When an entropy-based lossless encoder is used, such as an arithmetic encoder, the rate loss typically encourages the output of the Encoder NN to have low entropy. Example of rate losses are the following:

A differentiable estimate of the entropy;

A sparsification loss, i.e., a loss that encourages the output of the Encoder NN or the output of the quantization to have many zeros. Examples are L0 norm, L1 norm, L1 norm divided by L2 norm;

A cross-entropy loss applied to the output of a probability model, where the probability model may be a NN used to estimate the probability of the next symbol to be encoded by an arithmetic encoder.

One or more of reconstruction losses may be used, and one or more of the rate losses may be used, as a weighted sum. The different loss terms may be weighted using different weights, and these weights determine how the final system performs in terms of rate-distortion loss. For example, if more weight is given to the reconstruction losses with respect to the rate losses, the system may learn to compress less but to reconstruct with higher accuracy (as measured by a metric that correlates with the reconstruction losses). These weights may be considered to be hyper-parameters of the training session and may be set manually by the person designing the training session, or automatically for example by grid search or by using additional neural networks.

Figure 4:
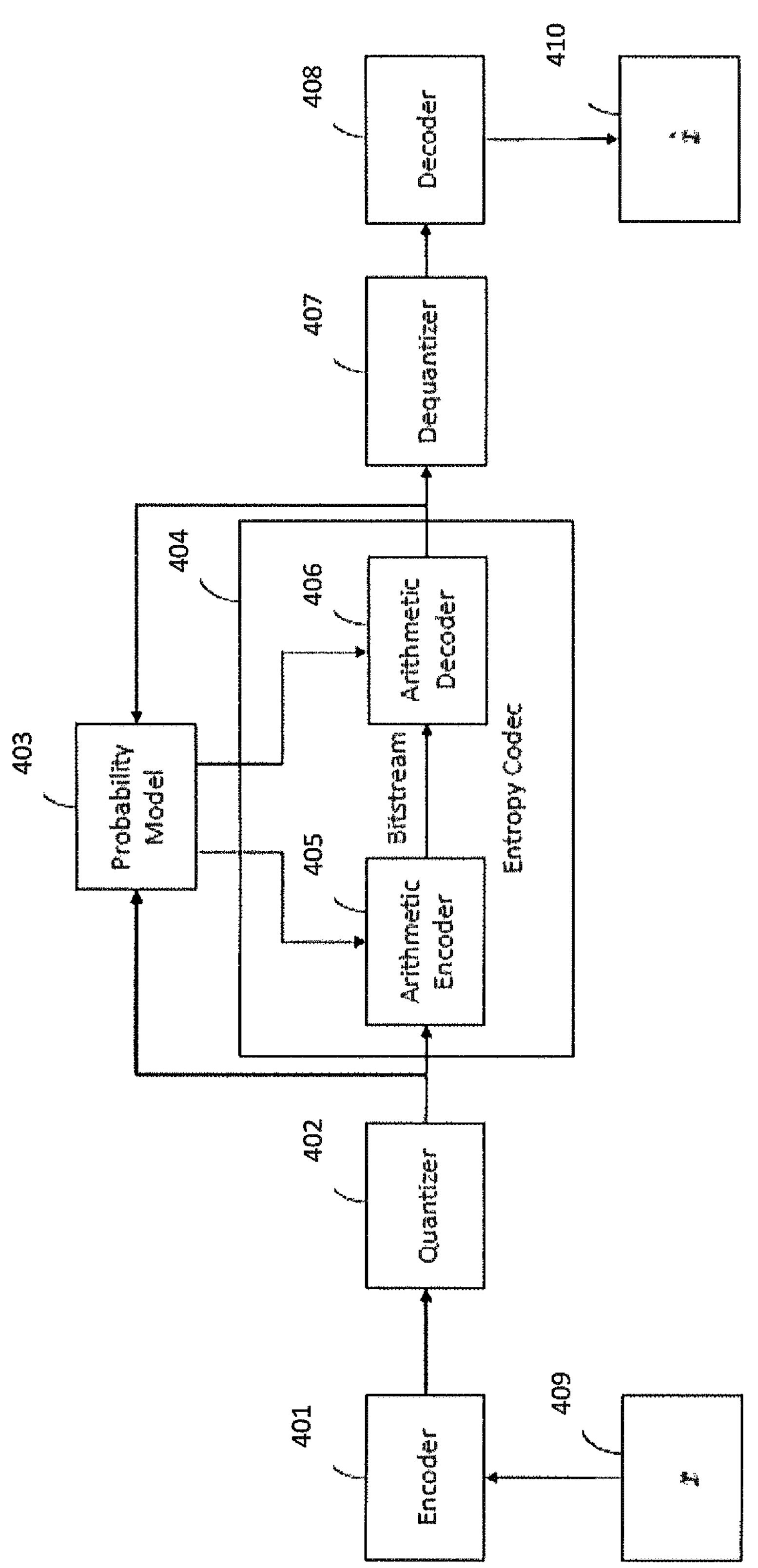
FIG. 4 shows an example of a neural network-based end-to-end learned video coding system.

As shown in FIG. 4, a neural network-based end-to-end learned video coding system may contain an encoder 401, a quantizer 402, a probability model 403, an entropy codec 420 (for example arithmetic encoder 405/arithmetic decoder 406), a dequantizer 407, and a decoder 408. The encoder 401 and decoder 408 may be two neural networks, or mainly comprise neural network components. The probability model 403 may also comprise mainly neural network components. Quantizer 402, dequantizer 407 and entropy codec 420 may not be based on neural network components, but they may also comprise neural network components, potentially.

On the encoder side, the encoder component 401 takes a video x 409 as input and converts the video from its original signal space into a latent representation that may comprise a more compressible representation of the input. In the case of an input image, the latent representation may be a 3-dimensional tensor, where two dimensions represent the vertical and horizontal spatial dimensions, and the third dimension represent the "channels" which contain information at that specific location. If the input image is a 128×128×3 RGB image (with horizontal size of 128 pixels, vertical size of 128 pixels, and 3 channels for the Red, Green, Blue color components), and if the encoder downsamples the input tensor by 2 and expands the channel dimension to 32 channels, then the latent representation is a tensor of dimensions (or "shape") 64×64×32 (i.e., with horizontal size of 64 elements, vertical size of 64 elements, and 32 channels). Please note that the order of the different dimensions may differ depending on the convention which is used; in some cases, for the input image, the channel dimension may be the first dimension, so for the above example, the shape of the input tensor may be represented as 3×128×128, instead of 128×128×3. In the case of an input video (instead of just an input image), another dimension in the input tensor may be used to represent temporal information.

The quantizer component 402 quantizes the latent representation into discrete values given a predefined set of quantization levels. Probability model 403 and arithmetic codec component 420 work together to perform lossless compression for the quantized latent representation and generate bitstreams to be sent to the decoder side. Given a symbol to be encoded into the bitstream, the probability model 403 estimates the probability distribution of all possible values for that symbol based on a context that is constructed from available information at the current encoding/decoding state, such as the data that has already been encoded/decoded. Then, the arithmetic encoder 405 encodes the input symbols to bitstream using the estimated probability distributions.

On the decoder side, opposite operations are performed. The arithmetic decoder 406 and the probability model 403 first decode symbols from the bitstream to recover the quantized latent representation. Then the dequantizer 407 reconstructs the latent representation in continuous values and pass it to decoder 408 to recover the input video/image. Note that the probability model 403 in this system is shared between the encoding and decoding systems. In practice, this means that a copy of the probability model 403 is used at encoder side, and another exact copy is used at decoder side.

In this system, the encoder 401, probability model 403, and decoder 408 may be based on deep neural networks. The system may be trained in an end-to-end manner by minimizing the following rate-distortion loss function:

$$L = D + \lambda R,$$

where D is the distortion loss term, R is the rate loss term, and A is the weight that controls the balance between the two losses. The distortion loss term may be the mean square error (MSE), structure similarity (SSIM) or other metrics that evaluate the quality of the reconstructed video. Multiple distortion losses may be used and integrated into D, such as a weighted sum of MSE and SSIM. The rate loss term is normally the estimated entropy of the quantized latent representation, which indicates the number of bits necessary to represent the encoded symbols, for example, bits-per-pixel (bpp).

For lossless video/image compression, the system may contain only the probability model 403 and arithmetic encoder/decoder 405, 406. The system loss function contains only the rate loss, since the distortion loss is always zero (i.e., no loss of information).

Reducing the distortion in image and video compression is often intended to increase human perceptual quality, as humans are considered to be the end users, i.e., consuming/watching the decoded image. Recently, with the advent of machine learning, especially deep learning, there is a rising number of machines (i.e., autonomous agents) that analyze data independently from humans and that may even take decisions based on the analysis results without human intervention. Examples of such analysis are object detection, scene classification, semantic segmentation, video event detection, anomaly detection, pedestrian tracking, etc. Example use cases and applications are self-driving cars, video surveillance cameras and public safety, smart sensor networks, smart TV and smart advertisement, person re-identification, smart traffic monitoring, drones, etc. When the decoded data is consumed by machines, a different quality metric shall be used instead of human perceptual quality. Also, dedicated algorithms for compressing and decompressing data for machine consumption are likely to be different than those for compressing and decompressing data for human consumption. The set of tools and concepts for compressing and decompressing data for machine consumption is referred to here as Video Coding for Machines (VCM).

VCM concerns the encoding of video streams to allow consumption for machines. Machine is referred to indicate any device except human. Example of machine can be a mobile phone, an autonomous vehicle, a robot, and such intelligent devices which may have a degree of autonomy or run an intelligent algorithm to process the decoded stream beyond reconstructing the original input stream.

A machine may perform one or multiple tasks on the decoded stream. Examples of tasks can comprise the following:

- Classification: classify an image or video into one or more predefined categories. The output of a classification task may be a set of detected categories, also known as classes or labels. The output may also include the probability and confidence of each predefined category.
- Object detection: detect one or more objects in a given image or video. The output of an object detection task may be the bounding boxes and the associated classes of the detected objects. The output may also include the probability and confidence of each detected object.
- Instance segmentation: identify one or more objects in an image or video at the pixel level. The output of an instance segmentation task may be binary mask images or other representations of the binary mask images, e.g., closed contours, of the detected objects. The output may also include the probability and confidence of each object for each pixel.
- Semantic segmentation: assign the pixels in an image or video to one or more predefined semantic categories. The output of a semantic segmentation task may be binary mask images or other representations of the binary mask images, e.g., closed contours, of the assigned categories. The output may also include the probability and confidence of each semantic category for each pixel.

Object tracking: track one or more objects in a video sequence. The output of an object tracking task may include frame index, object ID, object bounding boxes, probability, and confidence for each tracked object.

Captioning: generate one or more short text descriptions for an input image or video. The output of the captioning task may be one or more short text sequences.

Human pose estimation: estimate the position of the key points, e.g., wrist, elbows, knees, etc., from one or more human bodies in an image of the video. The output of a human pose estimation includes sets of locations of each key point of a human body detected in the input image or video.

Human action recognition: recognize the actions, e.g., walking, talking, shaking hands, of one or more people in an input image or video. The output of the human action recognition may be a set of predefined actions, probability, and confidence of each identified action.

Anomaly detection: detect abnormal object or event from an input image or video. The output of an anomaly detection may include the locations of detected abnormal objects or segments of frames where abnormal events detected in the input video.

It is likely that the receiver-side device has multiple "machines" or task neural networks (Task-NNs). These multiple machines may be used in a certain combination which is for example determined by an orchestrator subsystem. The multiple machines may be used for example in succession, based on the output of the previously used machine, and/or in parallel. For example, a video which was compressed and then decompressed may be analyzed by one machine (NN) for detecting pedestrians, by another machine (another NN) for detecting cars, and by another machine (another NN) for estimating the depth of all the pixels in the frames.

In this description, "task machine" and "machine" and "task neural network" are referred to interchangeably, and for such referral any process or algorithm (learned or not from data) which analyzes or processes data for a certain task is meant. In the rest of the description, other assumptions made regarding the machines considered in this disclosure may be specified in further details. Also, term "receiver-side" or "decoder-side" are used to refer to the physical or abstract entity or device, which contains one or more machines, and runs these one or more machines on an encoded and eventually decoded video representation which is encoded by another physical or abstract entity or device, the "encoder-side device".

The encoded video data may be stored into a memory device, for example as a file. The stored file may later be provided to another device. Alternatively, the encoded video data may be streamed from one device to another.

Figure 5:
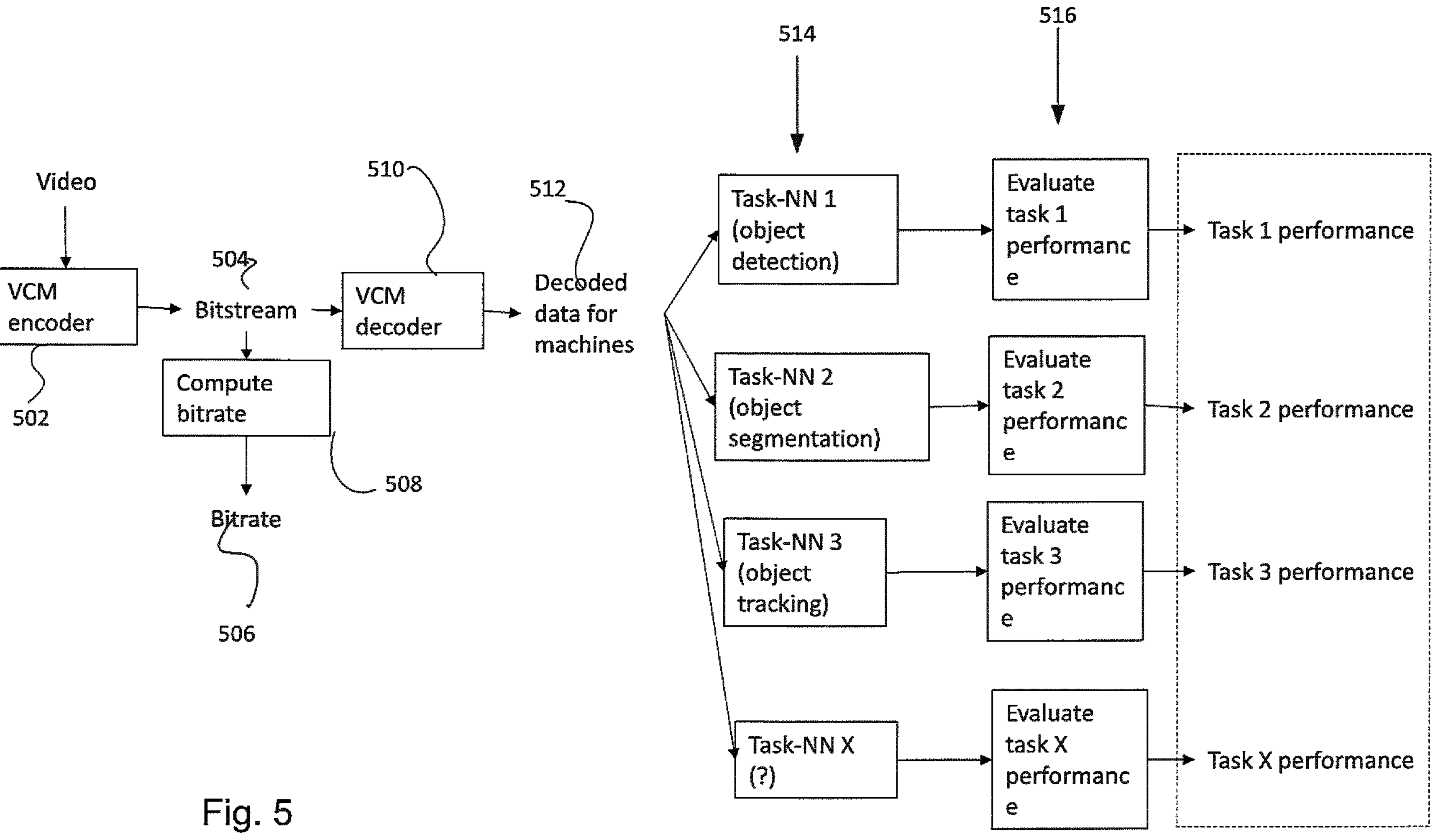
FIG. 5 shows an example of a video coding for machines.

FIG. 5 is a general illustration of the pipeline of Video Coding for Machines. A VCM encoder 502 encodes the input video into a bitstream 504. A bitrate 506 may be computed 508 from the bitstream 504 in order to evaluate the size of the bitstream. A VCM decoder 510 decodes the bitstream output by the VCM encoder 502. In FIG. 5, the output of the VCM decoder 510 is referred to as "Decoded data for machines" 512. This data may be considered as the decoded or reconstructed video. However, in some implementations of this pipeline, this data may not have same or similar characteristics as the original video which was input to the VCM encoder 502. For example, this data may not be easily understandable by a human when rendering the data onto a screen. The output of VCM decoder is then input to one or more task neural networks 514. In the figure, for the sake of illustrating that there may be any number of task-NNs 514, there are three example task-NNs, and a non-specified one (Task-NN X). The goal of VCM is to obtain a low bitrate representation of the input video while guaranteeing that the task-NNs still perform well in terms of the evaluation metric 516 associated to each task.

Figure 6:
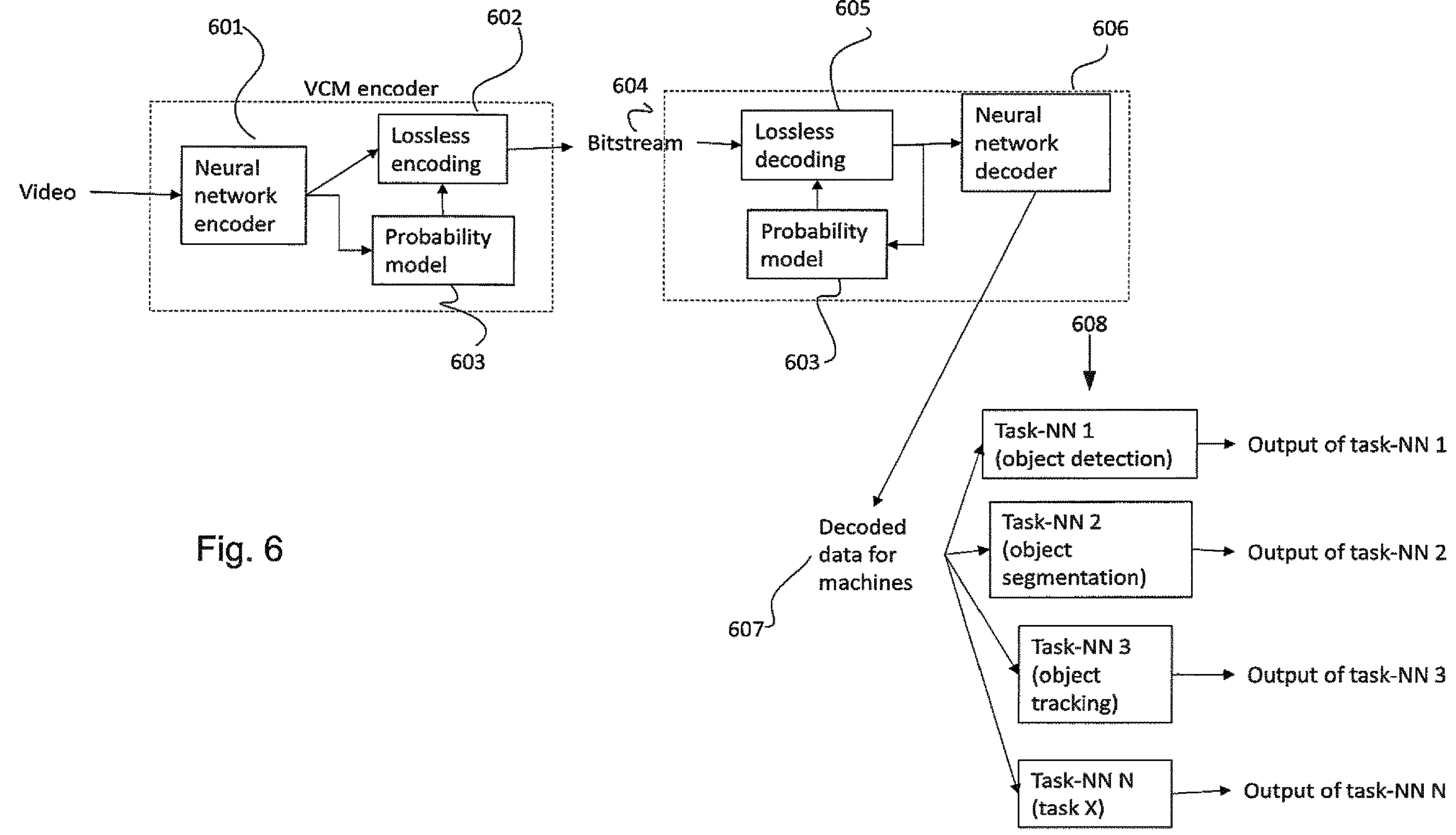
FIG. 6 shows an example of a pipeline for end-to-end learned system for video coding for machines.

One of the possible approaches to realize video coding for machines is an end-to-end learned approach. In this approach, the VCM encoder and VCM decoder mainly consist of neural networks. FIG. 6 illustrates an example of a pipeline for the end-to-end learned approach. The video is input to a neural network encoder 601. The output of the neural network encoder 601 is input to a lossless encoder 602, such as an arithmetic encoder, which outputs a bitstream 604. The output of the neural network encoder 601 may be input also to a probability model 603 which provides to the lossless encoder 602 with an estimate of the probability of the next symbol to be encoded by the lossless encoder 602. The probability model 603 may be learned by means of machine learning techniques, for example it may be a neural network. At decoder-side, the bitstream 604 is input to a lossless decoder 605, such as an arithmetic decoder, whose output is input to a neural network decoder 606. The output of the lossless decoder 605 may be input to a probability model 603, which provides the lossless decoder 605 with an estimate of the probability of the next symbol to be decoded by the lossless decoder 605. The output of the neural network decoder 606 is the decoded data for machines 607, that may be input to one or more task-NNs 608.

Figure 7:
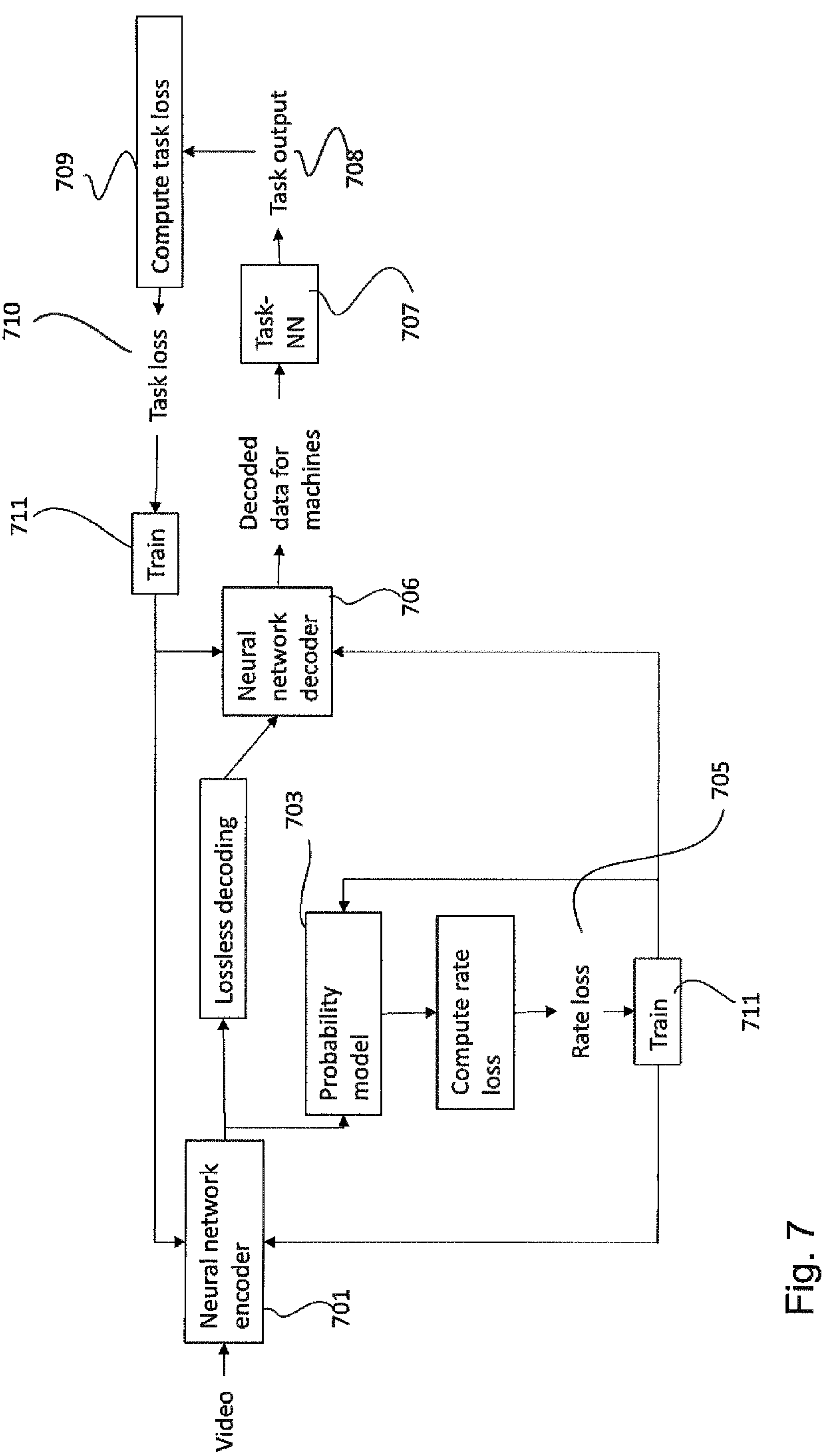
FIG. 7 shows an example of training an end-to-end learned codec.

FIG. 7 illustrates an example of how the end-to-end learned system may be trained for the purpose of video coding for machines. For the sake of simplicity, only one task-NN 707 is illustrated. A rate loss 705 may be computed from the output of the probability model 703. The rate loss 705 provides an approximation of the bitrate required to encode the input video data. A task loss 710 may be computed 709 from the output 708 of the task-NN 707.

The rate loss 705 and the task loss 710 may then be used to train 711 the neural networks used in the system, such as the neural network encoder 701, the probability model 703, the neural network decoder 706. Training may be performed by first computing gradients of each loss with respect to the trainable neural networks' parameters that are contributing or affecting the computation of that loss. The gradients are then used by an optimization method, such as Adam, for updating the trainable parameters of the neural networks.

The machine tasks may be performed at decoder side (instead of at encoder side) for multiple reasons, for example because the encoder-side device does not have the capabilities (computational, power, memory) for running the neural networks that perform these tasks, or because some aspects or the performance of the task neural networks may have changed or improved by the time that the decoder-side device needs the tasks results (e.g., different or additional semantic classes, better neural network architecture). Also, there could be a customization need, where different clients would run different neural networks for performing these machine learning tasks.

Entropy coding is a lossless compression method that compresses the input data into a bitstream with the aim of approaching the lower bound declared by Shannon's source coding theorem, which states that the minimal length to represent the input data equals to the entropy of it.

In a learned image/video codec, the latent representation generated by the encoder is encoded into a bitstream using the entropy coding method. A probability model may generate the estimation of the probability of the latent representation. The encoder and decoder may share the same probability model to encode and decode the latent representation.

The probability model may consider the elements in the latent representation as independent random variables or dependent random variables. In one example, based on an autoregressive model, the dependencies of the elements in a latent representation may be in a chain form by which an element is dependent on the one or more previous elements according to a predefined encoding/decoding order. In another example, the elements in the latent representation may be partitioned into multiple groups. The elements in one group may be independently distributed and dependent on the elements in one or more previous groups.

The probability model may use a parametric probability model, for example, Gaussian distribution model, or a nonparametric model to model the probability distribution of an element. When a Gaussian distribution model is used, the probability model may output the mean and variance of the Gaussian probability distribution function for an element. When a mixture of Gaussian distribution model is used, the probability model may output the mixture weights, the means, and the variances of the Gaussian probability distribution functions for an element.

Given the estimated distribution function of an element, the entropy codec encodes/decodes the element into/from the bitstream. The entropy codec may use arithmetic coding (AC), asymmetric numeral systems (ANS) and context-adaptive binary arithmetic coding (CABAC).

In an entropy codec, a pre-calculated distribution table may be used to represent the probability distribution functions to encode/decode an element in a latent representation. For example, in a distribution table for Gaussian distribution functions, the rows of the distribution table may represent different variance values and the columns of the distribution table may represent different values of the random variable. At the encoder side, given the estimated mean and variance for an element, the entropy encoder may first subtract the mean from the value of the element. Next, the entropy encoder may look up the distribution table based on the variance and determine the distribution function for the element. Finally, the entropy coding method encodes the element into the bitstream using the determined distribution function. At the decoder side, given the estimated mean and variance for an element, the entropy decoder looks up the distribution table based on the variance value to determine the distribution function. Next a value is decoded from the bitstream using the determined distribution function. Next, the estimated mean is added to the decoded value to generate the decoded element.

Because of memory limitation, the distribution table that contains the precalculated distribution functions may have a limited size, for example, a fixed width. When Gaussian distribution function is used, the distribution table may cover a certain range of input values, for example, from $-3\sigma$ to $+3\sigma$, where $\sigma$ is the standard deviation of the Gaussian probability distribution function. However, if an input value is out of the input range of a precalculated distribution function, the value cannot be encoded/decoded correctly using the precalculated distribution function.

Increasing the width of the distribution table may reduce the probability that an element falls out of the input range of a precalculated distribution function, however, the out-of-range (OOR) values may still be encountered.

Another problem is that the model used to describe the distribution of the elements in the latent representation may not be accurate. For example, the values that fall out of the range of a precalculated distribution function may deviate from the predefined distribution function. For example, this may happen when a Gaussian distribution function is used to approximate a long-tail distribution function. In this situation, the encoding performance may be lowered (e.g., the resulting bitrate may be higher).

The present embodiments are targeted to methods for encoding and decoding out-of-range (OOR) values, for example values of elements in a latent representation.

According to an embodiment, an out-of-range tag, for example, the maximum value within the input range of the precalculated distribution function, may be used to indicate an OOR value. Next, the difference between the input value and the maximum value within the input range of the precalculated distribution function may be encoded/decoded to/from the bitstream using the precalculated distribution function.

According to another embodiment, the encoder may determine the range of the elements in a latent representation and calculate the distribution function at inference stage. The range value may be signaled to the decoder side to generate the same distribution table as the encoder.

These and other embodiments are discussed in more detailed in the following.

Precalculated Distribution Function and Distribution Table

A distribution function outputs the probability value given an input value. The distribution functions used by the entropy encoder to encode the elements in a latent representation may be calculated offline and shared between the encoder and the decoder. The following table shows an example of precalculated distribution function where the range of the input value is from −3 to +3. In the table, the maximum value of the input is +3 and the minimum value is −3. In this disclosure, it is assumed that the minimum input value is a negative number and the maximum input value is a positive number. However, other assumptions are possible as well.

| Input value | −3 | −2 | −1 | 0 | 1 | 2 | 3 |
|---|---|---|---|---|---|---|---|
| Probability value | 0.1 | 0.1 | 0.15 | 0.3 | 0.15 | 0.1 | 0.1 |

Precalculated distribution functions may be put together to formulate a distribution table, where a row represents the distribution function, and a column represents the input value.

Out-of-Range Value Encoding/Decoding

According to some embodiments, an out-of-range tag (OOR-tag) may be used to indicate that an input value is out of the input range of the precalculated distribution function. The OOR-tag may be the maximum or the minimum input value of the precalculated distribution function. In this disclosure, the maximum input value of the precalculated distribution function is used as the OOR-tag. The input range of a precalculated distribution function is the values between the minimum input value (inclusive) and the maximum input value (exclusive). Alternatively, it is possible to apply the described methods using the minimum input value of the precalculated distribution function as the OOR-tag. In an alternative embodiment, any other predefined value (e.g., any other value which is known at both encoder and decoder sides) which is comprised in the input range may be used as an OOR-tag, as long as this value is known at both encoder and decoder ends. In another alternative embodiment, the value that indicates an OOR-tag, may be signaled along the bitstream by means of a high-level syntax, for example in a picture header, or in a slice header, or in a sequence parameter set. For a certain video sequence, an encoder may signal one or more values that indicate an OOR-tag to the decoder.

The following embodiments describe methods, where the maximum input value is used as the OOR-tag. It is appreciated that the OOR-tag can be a minimum input value or another predefined value in the input range.

According to an embodiment, when it is determined that an input value is not less than the maximum input value of the precalculated distribution function, e.g., the OOR-tag, the entropy encoder may first encode the OOR-tag into the bitstream. Then a difference between the input value and the OOR-tag is determined.

The difference is compared to the maximum input value of a precalculated distribution function for the OOR values, named as the OOR distribution function. If the difference is not less than the maximum input value of the OOR distribution function, the OOR-tag of the OOR distribution function is encoded into the bitstream and a second difference value (i.e., an updated difference value) is calculated by subtracting the maximum value of the OOR distribution function from the first difference value. The second difference value is compared to the OOR-tag of the OOR distribution function, and if the second difference value is less than the OOR-tag of the OOR distribution function, the second difference may be encoded to the bitstream using the OOR-distribution function. Otherwise, this procedure may be repeated until the updated difference value is within the input range of the OOR distribution function.

The difference is encoded to the bitstream using the OOR distribution function. It is appreciated that the difference is a non-negative number.

When it is determined that the input value is smaller than the minimum input value of the precalculated distribution function, the entropy encoder may first encode the OOR-tag into the bitstream using the precalculated distribution function. Next, the difference between the input value and the minimum input value of the precalculated distribution function (or the difference between the input value and another predefined input value) is calculated. It is appreciated that the difference value is a negative value. The difference value is compared to range of the input value of the OOR distribution function. If the difference value is within the range of the input value of the OOR distribution function, the difference value is encoded to the bitstream. Otherwise, the OOR-tag of the OOR distribution function is encoded to the bitstream and the second difference value (i.e., an updated difference value) is calculated by subtracting the minimum input value of the OOR distribution function from the first difference value. The second difference is compared to the range of the OOR distribution function, and if the second difference value is within the range of the OOR distribution function, the second difference value is encoded to the bitstream. Otherwise, this procedure may be repeated until a difference value is within the input range of the OOR distribution function is derived.

In one example, the OOR distribution function is the same distribution function to encode the original input value. In another example, the OOR distribution function is a dedicated distribution function to encode the OOR input values It is to be understood that other operations may be used instead of a difference operation, in order to obtain a new value to be encoded given the input value and, for example, the maximum input value or the minimum input value. For example, a division may be used. In one embodiment, the operation used to obtain a new value to be encoded may be signaled in or along the bitstream to the decoder.

The following algorithm shows an example of the described encoding procedure.

```
given input value v, precalculated distribution function f( ), minimum
value a of the input range of f( ), maximum value b, i.e., OOR-tag, of the
input range of f( ), OOR distribution function g( ), minimum value c of
the
input range of g( ), and maximum value d, i.e., the OOR tag, of the input
range of g( ).
if (v>=b) {
  let diff = v - b
    encode b using f( )
    while (diff >= d) {
      encode d using g( )
      let diff = diff - d
    }
    encode diff using g( )
} else if (v<a) {
  let diff = v - a
    encode b using f( )
    while (diff < c ) {
      encode d using g( )
      let diff = diff - c
    }
    encode diff using g( )
} else {
  encode v using f( )
}
```

At the decoder side, the decoder may define two variables, positive value variable and negative value variable, with initial value zero. When an OOR-tag is decoded from the bitstream, the positive value variable is added with the maximum input value of the precalculated distribution function, and the negative value variable is added with the minimum input value of the precalculated distribution function. Next, a value is decoded from the bitstream using the OOR distribution function. The decoder determines whether the value is the OOR tag of the OOR distribution function. If the value is not the OOR tag and the value is positive, the decoder adds the value to the positive value variable and outputs the positive value variable as the decoded value. If the value is not OOR-tag and the value is negative, the decoder adds the value to the negative value variable and outputs the negative value variable as the decoded value. If the value is the OOR-tag, the positive value variable is added by the maximum input value of the OOR distribution function and the negative value variable is added by the minimum input value of the OOR distribution function. The procedure may be repeated until a value that is not the OOR-tag of the OOR distribution function is decoded from the bitstream.

The following algorithm shows an example of the described method at the decoder side.

```
given input bitstream bs, precalculated distribution function f( ),
minimum value a of the input range of f( ), maximum value b, i.e.,
OOR-tag, of the input range of f( ), OOR distribution function g( ),
minimum value c of the input range of g( ), and maximum value d,
i.e., the OOR tag, of the input range of g( ).
decode v from bs using f( )
if (v==b) {
  let positive_v = b
  let negative_v = a
  decode v from bs using g( )
    while (v==d) {
      let positive_v = positive_v + d
      let negative_v = negative_v + c
    decode v from bs using g( )
```

-continued

```
        }
        if (v>=0) {
            return positive_v + v
        } else {
            return negative_v + v
        }
else {
    return v
}
```

According to an embodiment, the OOR distribution function may be the precalculated the distribution function to encode an input value.

According to another embodiment, the OOR distribution function may be a predefined distribution function.

According to yet another embodiment, the OOR distribution function may be determined by the precalculated distribution function to encode/decode an input value. The determination may be dependent on the variance of the precalculated distribution function. For example, when Gaussian distribution functions are used to encode the elements in a latent representation, if the estimated variance by the probability model is equal or larger than a predefined value, the precalculated distribution function is used as the OOR distribution function. If the estimated variance is less than a predefined value, a predefined distribution function is used as the OOR distribution function.

Bypass Mode

In another embodiment, when the input value is out of the range of the input values for a precalculated distribution function, the input value may be encoded using a bypass mode, i.e., encoded without compression. The encoder may determine the encoding/decoding mode for an OOR value by the distribution function to encode/decode the value. For example, for a long-tail distribution function, the bypass mode may be used.

Expandable Distribution Table Mode

According to another embodiment, the encoder may determine the range of the elements in a latent representation and transfer the range to the decoder. The encoder and decoder may use the range to calculate the distribution functions at the inference stage to avoid values that are out of the input range for precalculated distribution functions.

Figure 8:
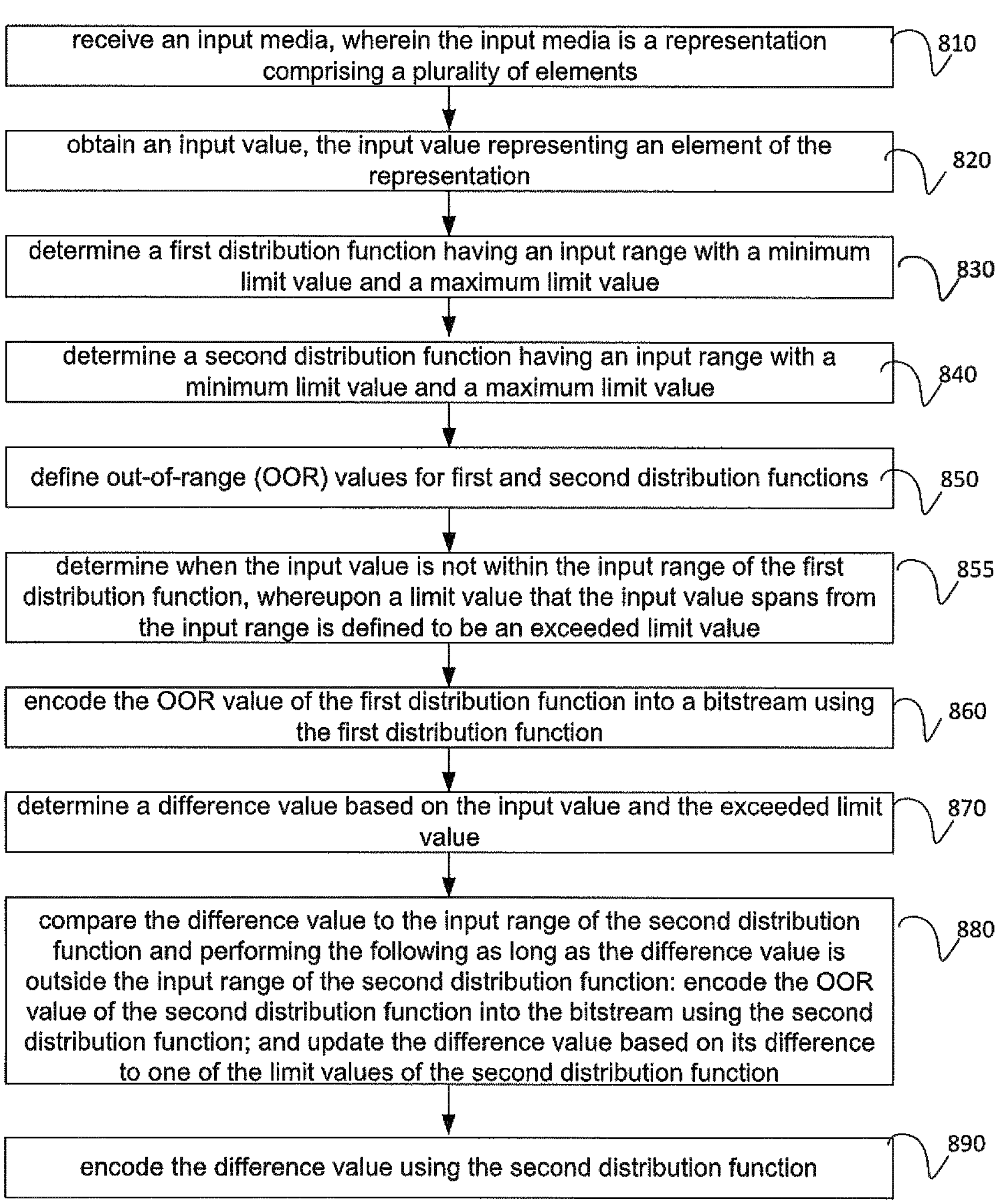
FIG. 8 is a flowchart illustrating a method for encoding according to an embodiment.

The method according to an embodiment is shown in FIG. 8. The method generally comprises receiving 810 an input media, wherein the input media is a representation comprising a plurality of elements; obtaining 820 an input value, the input value representing an element of the representation; determine 830 a first distribution function having an input range with a minimum limit value and a maximum limit value; determine 840 a second distribution function having an input range with a minimum limit value and a maximum limit value; defining 850 out-of-range (OOR) values for first and second distribution functions; determining 855 when the input value is not within the input range of the first distribution function, whereupon a limit value that the input value spans from the input range is defined to be an exceeded limit value. The method further comprises encoding 860 the OOR value of the first distribution function into a bitstream using the first distribution function; determining 870 a difference value based on the input value and the exceeded limit value; comparing 880 the difference value to the input range of the second distribution function and performing the following as long as the difference value is outside the input range of the second distribution function: encoding the OOR value of the second distribution function into the bitstream using the second distribution function; and updating the difference value based on its difference to one of the limit values of the second distribution function; encoding 890 the difference value using the second distribution function. Each of the steps can be implemented by a respective module of a computer system.

An apparatus according to an embodiment comprises means for receiving an input media, wherein the input media is a representation comprising a plurality of elements; means for obtaining an input value, the input value representing an element of the representation; means for determining a first distribution function having an input range with a minimum limit value and a maximum limit value; means for determining a second distribution function having an input range with a minimum limit value and a maximum limit value; means for defining out-of-range (OOR) values for first and second distribution functions; means for determining when the input value is not within the input range of the first distribution function, whereupon a limit value that the input value spans from the input range is defined to be an exceeded limit value. The apparatus further comprises means for encoding the OOR value of the first distribution function into a bitstream using the first distribution function; means for determining a difference value based on the input value and the exceeded limit value; means for comparing the difference value to the input range of the second distribution function and performing the following as long as the difference value is outside the input range of the second distribution function: encoding the OOR value of the second distribution function into the bitstream using the second distribution function; and updating the difference value based on its difference to one of the limit values of the second distribution function; means for encoding the difference value using the second distribution function. The means comprises at least one processor, and a memory including a computer program code, wherein the processor may further comprise processor circuitry. The memory and the computer program code are configured to, with the at least one processor, cause the apparatus to perform the method of FIG. 8 according to various embodiments.

Figure 9:
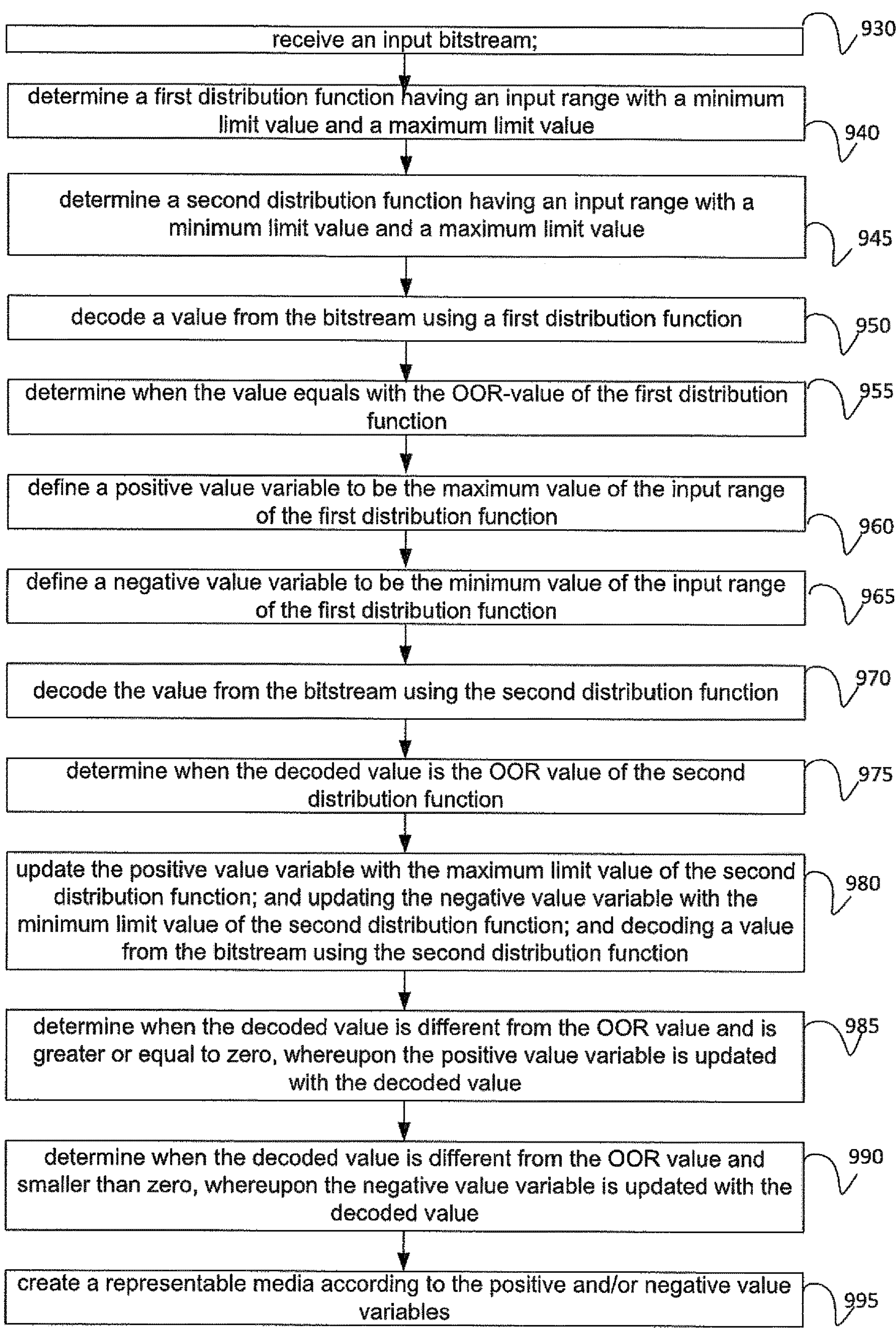
FIG. 9 is a flowchart illustrating a method for decoding according to an embodiment.

The method for decoding according to an embodiment is shown in FIG. 9. The method generally comprises receiving 930 an input bitstream; determining 940 a first distribution function having an input range with a minimum limit value and a maximum limit value; determining 945 a second distribution function having an input range with a minimum limit value and a maximum limit value; decoding 950 a value from the bitstream using a first distribution function; determining 955 when the value equals with the OOR-value of the first distribution function; whereupon the method further comprises defining 960 a positive value variable to be the maximum value of the input range of the first distribution function; defining 965 a negative value variable to be the minimum value of the input range of the first distribution function; decoding 970 the value from the bitstream using the second distribution function, whereupon the method further comprises determining 975 when the decoded value is the OOR value of the second distribution function, in which case 980 the positive value variable is updated with the maximum limit value of the second distribution function; and the negative value variable is updated with the minimum limit value of the second distribution function; a value is decoded from the bitstream using the second distribution function; determining 985 when the decoded value is different from the OOR value and is greater or equal to zero, whereupon the positive value variable is updated with the decoded value; and determining 990 when the decoded value is different from the OOR value and smaller than zero, whereupon the negative value variable is updated with the decoded value; creating 995 a representable media according to the positive and/or negative value variables. Each of the steps can be implemented by a respective module of a computer system.

An apparatus according to an embodiment comprises means for receiving an input bitstream; means for determining a first distribution function having an input range with a minimum limit value and a maximum limit value; means for determining a second distribution function having an input range with a minimum limit value and a maximum limit value; means for decoding a value from the bitstream using a first distribution function; means for determining when the value equals with the OOR-value of the first distribution function; whereupon the apparatus further comprises means for defining a positive value variable to be the maximum value of the input range of the first distribution function; means for defining a negative value variable to be the minimum value of the input range of the first distribution function; means for decoding the value from the bitstream using the second distribution function, whereupon the apparatus further comprises means for determining when the decoded value is the OOR value of the second distribution function, in which case the positive value variable is updated with the maximum limit value of the second distribution function; and the negative value variable is updated with the minimum limit value of the second distribution function; a value is decoded from the bitstream using the second distribution function; means for determining when the decoded value is different from the OOR value and is greater or equal to zero, whereupon the positive value variable is updated with the decoded value; and means for determining when the decoded value is different from the OOR value and smaller than zero, whereupon the negative value variable is updated with the decoded value; means for creating a representable media according to the positive and/or negative value variables.

The means comprises at least one processor, and a memory including a computer program code, wherein the processor may further comprise processor circuitry. The memory and the computer program code are configured to, with the at least one processor, cause the apparatus to perform the method of FIG. 9 according to various embodiments.

Figure 10:
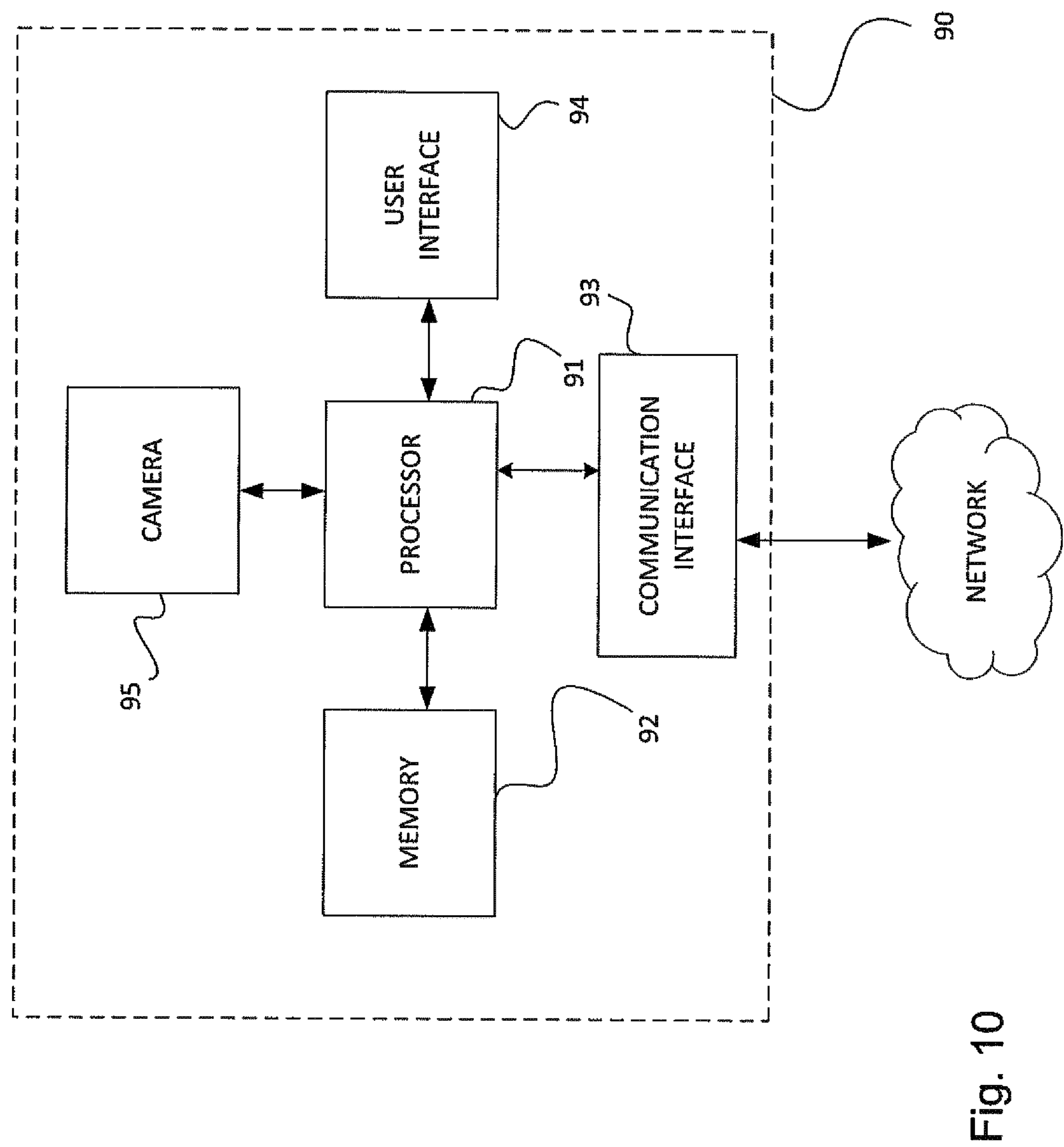
FIG. 10 shows an apparatus according to an embodiment.

An example of an apparatus is shown in FIG. 10. The apparatus is a user equipment for the purposes of the present embodiments. The apparatus 90 comprises a main processing unit 91, a memory 92, a user interface 94, a communication interface 93. The apparatus according to an embodiment, shown in FIG. 10, may also comprise a camera module 95. Alternatively, the apparatus may be configured to receive image and/or video data from an external camera device over a communication network. The memory 92 stores data including computer program code in the apparatus 90. The computer program code is configured to implement the method according to various embodiments by means of various computer modules. The camera module 95 or the communication interface 93 receives data, in the form of images or video stream, to be processed by the processor 91. The communication interface 93 forwards processed data, i.e., the image file, for example to a display of another device, such a virtual reality headset. When the apparatus 90 is a video source comprising the camera module 95, user inputs may be received from the user interface.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of various embodiments.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus comprising: at least one processor; and at least one memory storing instructions that, when executed by the at least one processor, cause the apparatus at least to perform: receiving an input media, wherein the input media is a representation comprising a plurality of elements; obtaining an input value, the input value representing an element of the representation; determining a first distribution function having an input range with a minimum limit value and a maximum limit value; determining a second distribution function having an input range with a minimum limit value and a maximum limit value; defining out-of-range (OOR) values for first and second distribution functions; determining when the input value is not within the input range of the first distribution function, whereupon a limit value that the input value spans from the input range is defined to be an exceeded limit value; and the apparatus is further caused to perform:

encoding the OOR value of the first distribution function into a bitstream using the first distribution function;

determining a difference value based on the input value and the exceeded limit value;

comparing the difference value to the input range of the second distribution function and performing the following as long as the difference value is outside the input range of the second distribution function:

encoding the OOR value of the second distribution function into the bitstream using the second distribution function;

updating the difference value based on its difference to one of the limit values of the second distribution function;

and encoding the difference value using the second distribution function.

2. The apparatus according to claim 1, wherein when the exceeded limit value is the maximum limit value of the first distribution function, the apparatus is caused to perform:

encoding the OOR value using the first distribution function;

determining a difference value based on the input value and the maximum value of the input range of the first distribution function;

comparing the difference value to the input range of the second distribution function, and performing the following as long as the difference value is outside the input range of the second distribution function:

encoding the OOR value using the second distribution function;

updating the difference value based on its difference to the maximum input value of the second distribution function;

and encoding the difference value using the second distribution function.

3. The apparatus according to claim 1, wherein when the exceeded limit value is the minimum limit value of the first distribution function, the apparatus is caused to perform:

encoding the OOR value using the first distribution function;

determining a difference value based on the input value and the minimum value of input range of the first distribution function;

comparing the difference value to the input range of the second distribution function;

and performing the following as long as the difference value is outside the input range of the second distribution function:

encoding the OOR value using the second distribution function;

updating the difference value based on its difference to the minimum input value of the second distribution function;

and encoding the difference value using the second distribution function.

4. The apparatus according to claim 1, wherein the second distribution function is an OOR distribution function configured to encode OOR values.

5. The apparatus according to claim 1, wherein the second distribution function is the first distribution function.

6. The apparatus according to claim 1, wherein the second distribution function is determined by the estimate variance value of the first distribution function.

7. The apparatus according to claim 1, wherein OOR value is a minimum, or a maximum, or any value of the input range.

8. The apparatus according to claim 1 is further caused to perform: signaling the OOR value to a decoder.

9. An apparatus comprising: at least one processor; and at least one memory storing instructions that, when executed by the at least one processor, cause the apparatus at least to perform: receiving an input bitstream; determining a first distribution function having an input range with a minimum limit value and a maximum limit value; determining a second distribution function having an input range with a minimum limit value and a maximum limit value; decoding a value from the bitstream using a first distribution function; and determining when the value equals with the OOR-value of the first distribution function, whereupon the apparatus is further caused to perform:

defining a positive value variable to be the maximum value of the input range of the first distribution function;

defining a negative value variable to be the minimum value of the input range of the first distribution function;

decoding the value from the bitstream using the second distribution function, whereupon the apparatus is further caused to perform:

determining when the decoded value is the OOR value of the second distribution function, in which case the positive value variable is updated with the maximum limit value of the second distribution function; and the negative value variable is updated with the minimum limit value of the second distribution function; a value is decoded from the bitstream using the second distribution function;

determining when the decoded value is different from the OOR value and is greater or equal to zero, whereupon the positive value variable is updated with the decoded value;

and determining when the decoded value is different from the OOR value and smaller than zero, whereupon the negative value variable is updated with the decoded value;

and creating a representable media according to the positive and/or negative value variables.

10. A method comprising: receiving an input media, wherein the input media is a representation comprising a plurality of elements; obtaining an input value, the input value representing an element of the representation; determining a first distribution function having an input range with a minimum limit value and a maximum limit value; determining a second distribution function having an input range with a minimum limit value and a maximum limit value; defining out-of-range (OOR) values for first and second distribution functions; determining when the input value is not within the input range of the first distribution function, whereupon a limit value that the input value spans from the input range is defined to be an exceeded limit value and the method further comprises:

encoding the OOR value of the first distribution function into a bitstream using the first distribution function;

determining a difference value based on the input value and the exceeded limit value;

comparing the difference value to the input range of the second distribution function and performing the following as long as the difference value is outside the input range of the second distribution function:

encoding the OOR value of the second distribution function into the bitstream using the second distribution function;

updating the difference value based on its difference to one of the limit values of the second distribution function;

and encoding the difference value using the second distribution function.

11. The method according to claim 10, wherein when the exceeded limit value is the maximum limit value of the first distribution function, the method comprises:

encoding the OOR value using the first distribution function;

determining a difference value based on the input value and the maximum value of the input range of the first distribution function;

comparing the difference value to the input range of the second distribution function, and performing the following as long as the difference value is outside the input range of the second distribution function:

encoding the OOR value using the second distribution function;

updating the difference value based on its difference to the maximum input value of the second distribution function;

and encoding the difference value using the second distribution function.

12. The method according to claim 10, wherein when the exceeded limit value is the minimum limit value of the first distribution function, the method comprises:

encoding the OOR value using the first distribution function;

determining a difference value based on the input value and the minimum value of input range of the first distribution function;

comparing the difference value to the input range of the second distribution function; and performing the following as long as the difference value is outside the input range of the second distribution function:

encoding the OOR value using the second distribution function;

updating the difference value based on its difference to the minimum input value of the second distribution function;

and encoding the difference value using the second distribution function.

13. The method according to claim 10, wherein the second distribution function is an OOR distribution function configured to encode OOR values.

14. The method according to claim 10, wherein the second distribution function is the first distribution function.

15. The method according to claim 10, wherein the second distribution function is determined by the estimate variance value of the first distribution function.

16. The method according to claim 10, wherein OOR value is a minimum, or a maximum, or any value of the input range.

17. The method according to claim 10, further comprising: signaling the OOR value to a decoder.

* * * * *